United States Patent
Bowen et al.

(10) Patent No.: US 7,401,338 B1
(45) Date of Patent: Jul. 15, 2008

(54) SYSTEM AND METHOD FOR AN ACCESS LAYER APPLICATION PROGRAMMING INTERFACE FOR MANAGING HETEROGENEOUS COMPONENTS OF A STORAGE AREA NETWORK

(75) Inventors: Jerre F. Bowen, Sunnyvale, CA (US);
Anup R. Mathkar, Maharashtra (IN);
Rajat Mathur, Sunnyvale, CA (US);
Samina M. A. Syed, Maharashtra (IN);
Thomas W. Weimer, Albany, CA (US);
James E. Bennett, Sunnyvale, CA (US);
Carl W. Braganza, Sunnyvale, CA (US); Tarun Dwivedi, San Jose, CA (US)

(73) Assignee: Symantec Operating Corporation, Mountain View, CA (US)

( * ) Notice: Subject to any disclaimer, the term of this patent is extended or adjusted under 35 U.S.C. 154(b) by 725 days.

(21) Appl. No.: 10/256,419

(22) Filed: Sep. 27, 2002

(51) Int. Cl.
*G06F 3/00* (2006.01)
*G06F 9/44* (2006.01)
*G06F 9/46* (2006.01)
*G06F 13/00* (2006.01)
*G06F 15/173* (2006.01)
*G06F 15/177* (2006.01)
*G06F 7/04* (2006.01)
*G06F 17/30* (2006.01)
*G06K 9/00* (2006.01)
*H04L 9/32* (2006.01)

(52) U.S. Cl. .............. 719/328; 719/313; 719/320; 719/330; 709/200; 709/223; 726/2

(58) Field of Classification Search ............... 707/10; 719/315, 328, 313, 320, 330; 709/217, 223–225, 709/229, 220; 711/111–112, 114; 710/36; 726/2–7; 715/741
See application file for complete search history.

(56) References Cited

U.S. PATENT DOCUMENTS 6,070,244 A 5/2000 Orchier et al.

(Continued)

OTHER PUBLICATIONS

"The Authoritative Dictionary of IEEE Standards Terms," Dec. 2000, Standards Information Network IEEE Press, Seventh Edition, p. 297.*
"QLDIRECT QLogic Optimizing and Multipath Driver for Windows NT V4.0 and Windows 2000," (5 Pages), 2000.
"QLogic Software Suite Streamlines SAN Management," FCIA Member Company Press Release, Nov. 9, 1999, (3 Pages).
"The Architecture of Veritas SANPoint Control tm 2.0," Veritas Software Corporation, 2001, (42 Pages).

(Continued)

*Primary Examiner*—Meng-Ai An
*Assistant Examiner*—Qing-Yuan Wu
(74) *Attorney, Agent, or Firm*—Robert C. Kowert; Meyertons, Hood, Kivlin, Kowert & Goetzel, P.C.

(57) ABSTRACT

Embodiments of an application programming interface (API) for a Storage Area Network (SAN) access layer. A SAN may include a SAN access layer as an interface between SAN components and client applications. A SAN access layer API may be provided which enables a client application to access SAN access layer functionality such as storage management and configuration services. Through the SAN access layer API, a client application may invoke some or all of the functionalities of the SAN access layer. The SAN access layer may provide SAN information gathered from the SAN to the client application through the SAN access layer API. Embodiments of the SAN access layer API may provide security and licensing restrictions to client applications. Embodiments of the SAN access layer API may encapsulate message conversion and network transport functions so that client application developers are not required to implement these functions.

31 Claims, 11 Drawing Sheets

U.S. PATENT DOCUMENTS

| | | | |
|---|---|---|---|
| 6,085,200 A | 7/2000 | Hill et al. | |
| 6,101,508 A | 8/2000 | Wolff | |
| 6,204,782 B1 | 3/2001 | Gonzales | |
| 6,253,240 B1 | 6/2001 | Axberg et al. | |
| 6,279,037 B1 | 8/2001 | Tams et al. | |
| 6,317,743 B1 | 11/2001 | Heck | |
| 6,347,342 B1 * | 2/2002 | Marcos et al. | 719/315 |
| 6,389,432 B1 | 5/2002 | Pothapragada et al. | |
| 6,389,464 B1 | 5/2002 | Krishnamurthy et al. | |
| 6,400,730 B1 | 6/2002 | Latif et al. | |
| 6,407,680 B1 | 6/2002 | Lai et al. | |
| 6,593,860 B2 | 7/2003 | Lai et al. | |
| 6,601,187 B1 | 7/2003 | Sicola et al. | |
| 6,636,239 B1 | 10/2003 | Arquie et al. | |
| 6,640,278 B1 | 10/2003 | Nolan | |
| 6,654,747 B1 * | 11/2003 | Van Huben et al. | 707/10 |
| 6,654,830 B1 | 11/2003 | Taylor | |
| 6,671,776 B1 | 12/2003 | DeKoning | |
| 6,697,924 B2 | 2/2004 | Swank | |
| 6,714,952 B2 | 3/2004 | Dunham et al. | |
| 6,738,821 B1 | 5/2004 | Wilson et al. | |
| 6,769,022 B1 | 7/2004 | DeKoning et al. | |
| 6,807,181 B1 * | 10/2004 | Weschler | 370/400 |
| 6,826,580 B2 | 11/2004 | Harris et al. | |
| 6,839,750 B1 | 1/2005 | Bauer et al. | |
| 6,854,035 B2 | 2/2005 | Dunham et al. | |
| 6,898,670 B2 | 5/2005 | Nahum | |
| 6,920,491 B2 | 7/2005 | Kim | |
| 6,920,494 B2 * | 7/2005 | Heitman et al. | 709/223 |
| 6,944,654 B1 | 9/2005 | Murphy et al. | |
| 6,947,939 B2 | 9/2005 | Fujibayashi et al. | |
| 6,950,871 B1 | 9/2005 | Honma et al. | |
| 6,965,951 B2 * | 11/2005 | Kim | 710/19 |
| 6,985,956 B2 * | 1/2006 | Luke et al. | 709/229 |
| 6,988,102 B2 | 1/2006 | Rossiter et al. | |
| 6,996,670 B2 * | 2/2006 | Delaire et al. | 711/114 |
| 7,010,796 B1 * | 3/2006 | Strom et al. | 719/328 |
| 7,069,395 B2 * | 6/2006 | Camacho et al. | 711/152 |
| 7,089,293 B2 * | 8/2006 | Grosner et al. | 709/217 |
| 7,103,653 B2 | 9/2006 | Iwatani | |
| 7,143,615 B2 * | 12/2006 | Connor et al. | 709/224 |
| 7,216,184 B2 * | 5/2007 | Milner et al. | 710/10 |
| 2001/0054093 A1 | 12/2001 | Iwatani | |
| 2002/0059263 A1 | 5/2002 | Shima et al. | |
| 2002/0059397 A1 | 5/2002 | Feola et al. | |
| 2002/0095602 A1 | 7/2002 | Pherson et al. | |
| 2002/0099914 A1 | 7/2002 | Matsunami et al. | |
| 2002/0161871 A1 | 10/2002 | Shanthaveeraiah et al. | |
| 2002/0194407 A1 | 12/2002 | Kim | |
| 2003/0055932 A1 | 3/2003 | Brisse | |
| 2003/0084076 A1 | 5/2003 | Sekiguchi et al. | |
| 2003/0085914 A1 | 5/2003 | Takaoka et al. | |
| 2003/0105830 A1 | 6/2003 | Pham et al. | |
| 2003/0130821 A1 | 7/2003 | Anslow et al. | |
| 2003/0140128 A1 | 7/2003 | Cox et al. | |
| 2003/0154267 A1 | 8/2003 | Comacho et al. | |
| 2003/0154268 A1 | 8/2003 | Sato | |
| 2003/0167327 A1 * | 9/2003 | Baldwin et al. | 709/225 |
| 2003/0204701 A1 | 10/2003 | Mimatsu et al. | |
| 2003/0208581 A1 * | 11/2003 | Behren et al. | 709/223 |
| 2003/0208589 A1 | 11/2003 | Yamamoto | |
| 2003/0220991 A1 | 11/2003 | Soejima et al. | |
| 2003/0225896 A1 | 12/2003 | Jain et al. | |
| 2003/0225993 A1 | 12/2003 | Yagisawa et al. | |
| 2004/0024863 A1 * | 2/2004 | Connor et al. | 709/224 |
| 2004/0024984 A1 | 2/2004 | Lanzatella et al. | |
| 2004/0025166 A1 | 2/2004 | Adlung et al. | |

OTHER PUBLICATIONS

High Availability Storage Networks with the Cisco MDS 9500 Series of Multilayer Directors, Cisco Systems, Aug. 2002, (14 pages).

Scott Lukes, "Building Bulletproof Security When Connecting SANs over WANs, while maintaining gigabit speeds, presents challenges," InfoStor, Mar. 2002, (7 pages).

StorageWorks Fibre Channel SAN Switch 16-EL, Compaq, Mar. 21, 2002, (6 pages).

\* cited by examiner

SYSTEM AND METHOD FOR AN ACCESS LAYER APPLICATION PROGRAMMING INTERFACE FOR MANAGING HETEROGENEOUS COMPONENTS OF A STORAGE AREA NETWORK

BACKGROUND OF THE INVENTION

1. Field of the Invention

This invention is related to the field of storage management and, more particularly, to software used in management of storage area networks.

2. Description of the Related Art

In the past, large organizations relied heavily on parallel SCSI (Small Computer System Interface) technology to provide the performance required for their enterprise data storage needs. More recently, organizations are recognizing that the restrictions imposed by SCSI architecture are too costly for SCSI to continue as a viable solution. Such restrictions include the following:

- SCSI disk arrays must be located no more than 25 meters from the host server;
- The parallel SCSI bus is susceptible to data errors resulting from slight timing discrepancies or improper port termination; and
- SCSI array servicing frequently requires downtime for every disk in the array.

One solution has been to create technology that enables storage arrays to reside directly on the network, where disk accesses may be made directly rather than through the server's SCSI connection. This network-attached storage (NAS) model eliminates SCSI's restrictive cable distance, signal timing, and termination requirements. However, it adds a significant load to the network, which frequently is already starved for bandwidth. Gigabit Ethernet technology only alleviates this bottleneck for the short term, so a more elegant solution is desirable.

The storage area network (SAN) model places storage on its own dedicated network, removing data storage from both the server-to-disk SCSI bus and the main user network. This dedicated network most commonly uses Fibre Channel technology, a versatile, high-speed transport. The SAN includes one or more hosts that provide a point of interface with LAN users, as well as (in the case of large SANs) one or more fabric switches, SAN hubs and other devices to accommodate a large number of storage devices. The hardware (e.g. fabric switches, hubs, bridges, routers, cables, etc.) that connects workstations and servers to storage devices in a SAN is referred to as a "fabric." The SAN fabric may enable server-to-storage device connectivity through Fibre Channel switching technology to a wide range of servers and storage devices.

The versatility of the SAN model enables organizations to perform tasks that were previously difficult to implement, such as LAN-free and server-free tape backup, storage leasing, and full-motion video services. SAN deployment promises numerous advantages, including cost management through storage consolidation, higher availability of data, better performance and seamless management of online and offline data. In addition, the LAN is relieved of the overhead of disk access and tape backup, data availability becomes less server-dependent, and downtime incurred by service and maintenance tasks affects more granular portions of the available storage system.

SUMMARY OF THE INVENTION

Embodiments of an application programming interface (API) for a Storage Area Network (SAN) access layer are described. A SAN may include a SAN access layer, for example on a host in the SAN, that may serve as an interface between SAN components (hardware and/or software) and client applications of the SAN system. A SAN access layer API may be provided which enables a client application to access SAN access layer functionality such as storage management and configuration services. Through the SAN access layer API, the client application may invoke some or all of the functionalities of the SAN access layer including one or more of, but not limited to, discovering interconnect (fabric) elements such as switches, storage devices, hosts, and SAN application information, and performing access control configuration and other management operations on the SAN. The SAN access layer may provide SAN information gathered from the SAN to the client application through the SAN access layer API.

Third-party client applications may desire to use portions of the discovery and configuration services that the SAN access layer provides. In one embodiment, the SAN access layer may provide an interface to full functionality of the SAN access layer. In one embodiment, the interface to the SAN access layer may provide limited or no security and/or license enforcement. In one embodiment, the SAN access layer API may expose a portion of the functionality of the SAN access layer to client-applications, and may also provide security and licensing restrictions to the client applications. In one embodiment, components of a SAN system including a SAN access layer such as a SAN management system may also leverage the SAN access layer API to access the SAN access layer.

In one embodiment, to use the interface provided by the SAN access layer, a client application may be required to use a parser (e.g. an XML parser) to translate messages received from the SAN access layer interface into format(s) compatible with the client application, and to convert messages in format(s) compatible with the client application into format(s) compatible with the SAN access layer interface. Further, the client application may be required to provide network transport (e.g. TCP/IP) to a particular socket of the SAN access layer. Embodiments of the SAN access layer API may encapsulate the message translation and network transport functions, and thus may simplify programming when developing client applications.

In one embodiment, the SAN access layer API may receive a request message or messages for accessing a function or functions of the SAN access layer and formatted in accordance with the SAN access layer API from a client application. The SAN access layer API may convert the request message(s) into markup language (e.g. XML) message(s) formatted in accordance with the SAN access layer interface. The SAN access layer API then may send the markup language message(s) to the SAN access layer on a network transport supported by the SAN access layer. In one embodiment, the SAN access layer API may open a communications connection (e.g. a socket) to the SAN access layer to transmit the message(s). The SAN access layer may then perform the requested task(s) as specified by the markup language message(s). Responses and/or results of a requested function(s) may be sent by the SAN access layer to the SAN access layer API in one or more markup language (e.g. XML) messages formatted according to the SAN access layer interface. The SAN access layer API may then parse and convert the markup language message(s) received from the SAN access layer to generate one or more messages in the SAN access layer API format. The SAN access layer API may then provide the results and/or responses to the client application in the one or more messages in the SAN access layer API format.

BRIEF DESCRIPTION OF THE DRAWINGS

The following detailed description makes reference to the accompanying drawings, which are now briefly described.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
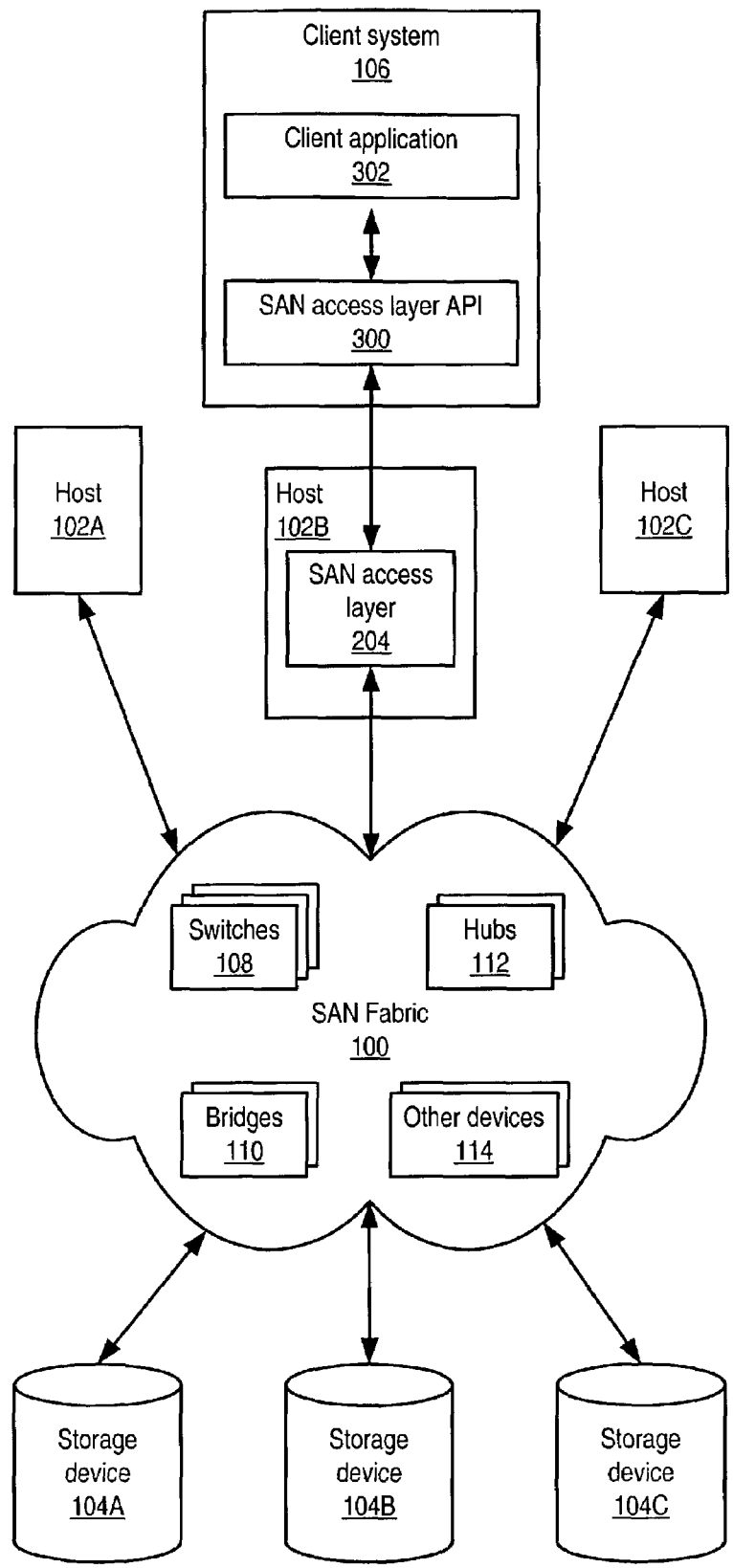
FIG. 1 shows an exemplary SAN implementing an embodiment of the SAN management system.

Embodiments of an application programming interface (API) for a Storage Area Network (SAN) access layer are described. FIG. 1 shows an exemplary SAN including a SAN access layer and a SAN access layer API according to one embodiment. For one embodiment, a SAN may be described as a high-speed, special-purpose network that interconnects storage devices 104 (e.g. storage devices 104A, 104B, and 104C) with associated data servers (e.g. hosts 102A, 102B, and 102C) on behalf of a larger network of users. This dedicated network may employ Fibre Channel technology.

A SAN may be part of the overall network of computing resources for an enterprise or other entity. A SAN may include one or more hosts 102 (e.g. hosts 102A, 102B, and 102C), one or more storage devices 104 (e.g. storage devices 104A, 104B, and 104C), and one or more SAN fabrics 100. A SAN may also include one or more client systems 106, which may access the SAN via a SAN access layer API 300 to the SAN access layer 204, for example via a network (e.g. Internet, Local Area Network (LAN), Wide Area Network (WAN), etc.) connection to one or more of the hosts 102.

Storage devices may include any of one or more types of storage devices including, but not limited to, storage systems such as RAID (Redundant Array of Independent Disks) systems, disk arrays, JBODs (Just a Bunch Of Disks, used to refer to disks that are not configured according to RAID), tape devices, and optical storage devices. These devices may be products of any of a number of vendors including, but not limited to, Compaq, EMC, and Hitachi. Hosts 102 may run any of a variety of operating systems, including, but not limited to, Solaris 2.6, 7 and 8, Microsoft Windows NT 4.0 (Server and Enterprise Server), and Microsoft Windows 2000 (Server, Advanced Server and Datacenter Editions). Each host 102 may be connected to the fabric 100 via one or more Host Bus Adapters (HBAs).

The hardware that connects hosts 102 (and other devices such as workstations) to storage devices 104 in a SAN may be referred to as a SAN fabric 100. The SAN fabric 100 enables server-to-storage device connectivity through Fibre Channel switching technology. The SAN fabric 100 hardware may include one or more of switches 108 (also referred to as fabric switches), bridges 110, hubs 112, or other devices 114 such as routers, as well as the interconnecting cables (for Fibre Channel SANs, fibre optic cables).

A SAN system may include a SAN access layer 204 that may serve as an interface between SAN components (hardware and/or software) and client applications 302 of the SAN system. A SAN access layer API 300 may be provided which enables a client application 302 to access SAN access layer 204 functionality such as storage management and configuration services. Through the SAN access layer API 300, the client application 302 may invoke some or all of the functionalities of the SAN access layer 204 including, one or more of, but not limited to, discovering interconnect elements (e.g. switches 108, Host Bus Adapters (HBAs), bridges 110, hubs 112, etc.), storage devices 104 (e.g. Just a Bunch of Disks (JBODs), tape drives, disk arrays, etc.), host 102 and SAN application information, and performing access control configuration and other management operations on the SAN. The SAN access layer 204 may provide SAN information gathered from the SAN to the client application 302 through the SAN access layer API 300.

While FIG. 1 shows the client application 302 and the SAN access layer API 300 running within a client system 106 separate from the host 102B running the SAN access layer 204, in one embodiment the client application 302 and the SAN access layer API 300 may run within the same machine as the SAN access layer 204. In one embodiment, the client application 302 and the SAN access layer API 300 may be components along with the SAN access layer 204 running within a server container on the same machine. In one embodiment, the client application 302 and the SAN access layer API 300 may be components running within a container (e.g. a client) separate from a server container running the SAN access layer 204 but running within the same machine. In one embodiment, the client application 302 may be a component of a SAN management server, such as the exemplary SAN management server described below, of which the SAN access layer 204 is also a component.

Third-party client applications 302 may desire to use portions of the discovery and configuration services that the SAN access layer 204 provides. In one embodiment, the SAN access layer 204 may provide an interface to full functionality of the SAN access layer. In one embodiment, the interface to the SAN access layer 204 may provide limited or no security and/or license enforcement. In one embodiment, the SAN access layer API 300 may expose a portion of the functionality of the SAN access layer 204 to client applications 300, and may also provide security and licensing restrictions to the client applications 300. In one embodiment, components of a SAN system including a SAN access layer 204, such as the exemplary SAN management system described below, may also leverage the SAN access layer API 300 to access the SAN access layer 204.

In one embodiment, in addition to the security issues described above, to use the interface provided by the SAN access layer 204, a client application 302 may be required to use a parser (e.g. an XML parser) to translate messages received from the SAN access layer 204 interface into format(s) compatible with the client application 302, and to convert messages, in format(s) compatible with the client application into format(s) compatible with the SAN access layer 204 interface. Further, the client application 302 may be required to provide network transport (e.g. TCP/IP) to a particular socket of the SAN access layer 204. Encapsulating the message translation and network transport functions in the SAN access layer API 300 may simplify programming when developing client applications 300.

Figure 2:
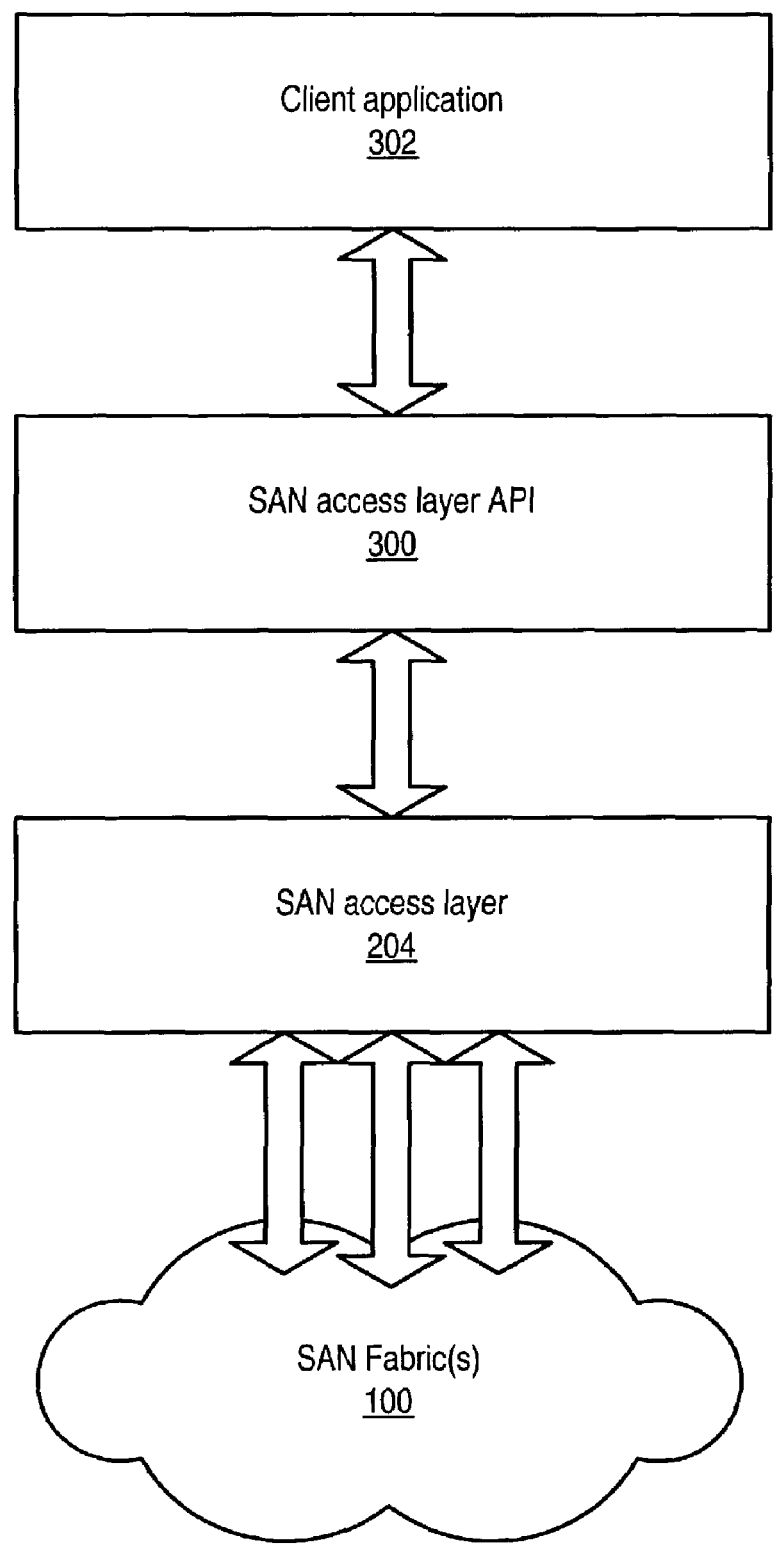
FIG. 2 illustrates the architecture of the SAN management system according to one embodiment.

FIG. 2 illustrates a SAN access layer and SAN access layer API according to one embodiment. Functions of the SAN access layer 204 may include, but are not limited to, discovery and zoning. By discovering objects and the relationship of these objects to each other, the SAN access layer 204 may maintain a real-time topology of the SAN. The SAN access layer 204 may also directly interface with switches on one or more fabrics 100 to manage the zoning of storage resources.

Embodiments of the SAN access layer API 300 may provide a single, secure point of entry into the SAN access layer 204 for client applications 302. In one embodiment, SAN access layer 204 may accept messages formatted according to a markup language (e.g. eXtensible Markup Language (XML)) and may output results of operations as messages formatted according to the markup language. Rather than requiring each heterogeneous client application 302 to handle markup language document construction and parsing, authentication, and transport (e.g. HTTP transport) support, the SAN access layer API 300 provides these functionalities for the client applications 302 through a common, relatively simple API.

In one embodiment, the SAN access layer 204 may provide limited or no security capabilities (e.g. license enforcement, authentication, etc.). The SAN access layer 204 may include an interface for accessing various functions of the SAN access layer 204. In one embodiment, this interface may be a proprietary interface, and the SAN access layer API 300 may provide access to a portion of the functions of the SAN access layer 204 to third-party client applications. In one embodiment, this interface may be provided by a SAN access layer agent (described below). If a user has access to and knows how to use the SAN access layer 204 interface, the user may access all of the functionality of the SAN access layer 204. Embodiments of the SAN access layer API 300 may provide a more limited and controlled API to the functions provided by the SAN access layer 204 interface that may be published for access by client applications 302. In one embodiment, to use the SAN access layer 204 via SAN access layer API 300, the client application 302 must have a key that may be passed to/through the SAN access layer API 300. In one embodiment, different access levels to the SAN access layer 204 may be provided as determined by the key.

In one embodiment, a client application 302 may provide a user interface for taking advantage of one or more of the SAN access layer 204 capabilities through the SAN access layer API 300. In one embodiment, the client application 302 may provide a graphical user interface for displaying the information compiled by and received from the SAN access layer 204 via the SAN access layer API 300 in graphical and/or textual format. Embodiments of the client application 302 may perform various SAN functions including one or more of, but not limited to, discovering SAN objects, creating and managing SAN object enclosures, SAN zoning management, generating and displaying reports on various aspects of the SAN, defining and naming groups of SAN objects, and LUN security/LUN management functions. Some embodiments of the client application 302 may provide a user interface that allows a user to interact with the SAN access layer 204 via the SAN access layer API 300 to perform one or more functions on the SAN. In one embodiment, multiple client application 302 may connect simultaneously with the SAN access layer 204 via SAN access layer APIs 300, for example using TCP/IP socket(s) assigned to the SAN access layer 204.

Figure 3A:
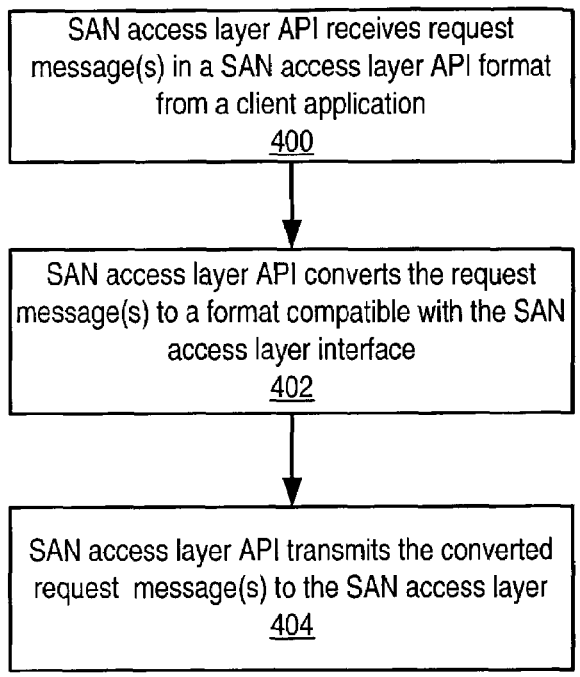
FIG. 3A is a flowchart illustrating a SAN access layer API converting client application requests to messages formatted according to the SAN access layer interface according to one embodiment.

FIG. 3A is a flowchart illustrating a SAN access layer API converting client application requests to messages formatted according to the SAN access layer interface according to one embodiment. As indicated at 400, the SAN access layer API may receive a request message or messages for accessing a function or functions of the SAN access layer and formatted in accordance with the SAN access layer API from a client application. As indicated at 402, the SAN access layer API may convert the request message(s) into markup language (e.g. XML) message(s) formatted in accordance with the SAN access layer interface. As indicated at 404, the SAN access layer API then may send the markup language message(s) to the SAN access layer on a network transport supported by the SAN access layer (e.g. via TCP/IP to a socket of the SAN access layer). In one embodiment, the SAN access layer API may open a communications connection (e.g. a socket) to the SAN access layer to transmit the message(s). The SAN access layer 204 may then perform the requested task(s) as specified by the markup language message(s).

Figure 3B:
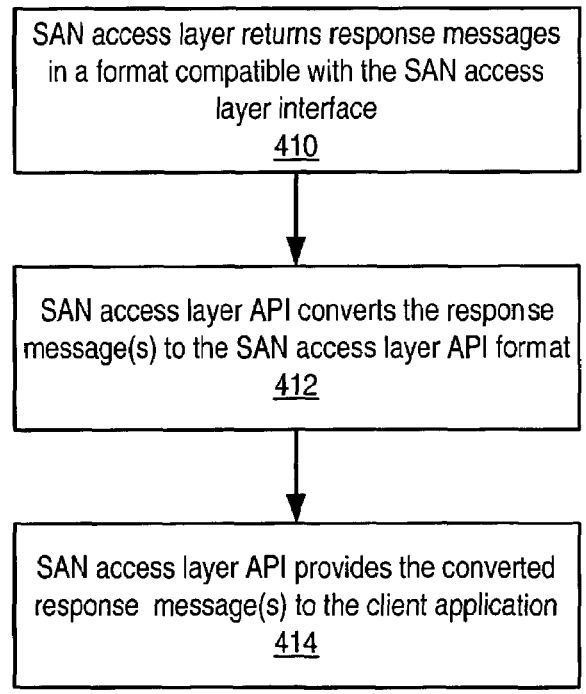
FIG. 3B is a flowchart illustrating the SAN access layer API converting response messages formatted according to the SAN access layer interface to messages formatted according to the SAN access layer API according to one embodiment.

FIG. 3B is a flowchart illustrating the SAN access layer API converting response messages formatted according to the SAN access layer interface to messages formatted according to the SAN access layer API according to one embodiment. As indicated at 410, responses and/or results of a requested function(s) may be sent by the SAN access layer to the SAN access layer API in one or more markup language (e.g. XML) messages formatted according to the SAN access layer interface. As indicated at 412, the SAN access layer API may then parse and convert the markup language message(s) received from the SAN access layer to generate one or more messages in the SAN access layer API format. As indicated at 414, the SAN access layer API may then provide the results and/or responses to the client application in the one or more messages in the SAN access layer API format. In one embodiment, the communications connection (e.g. socket) may then be closed.

Figure 4:
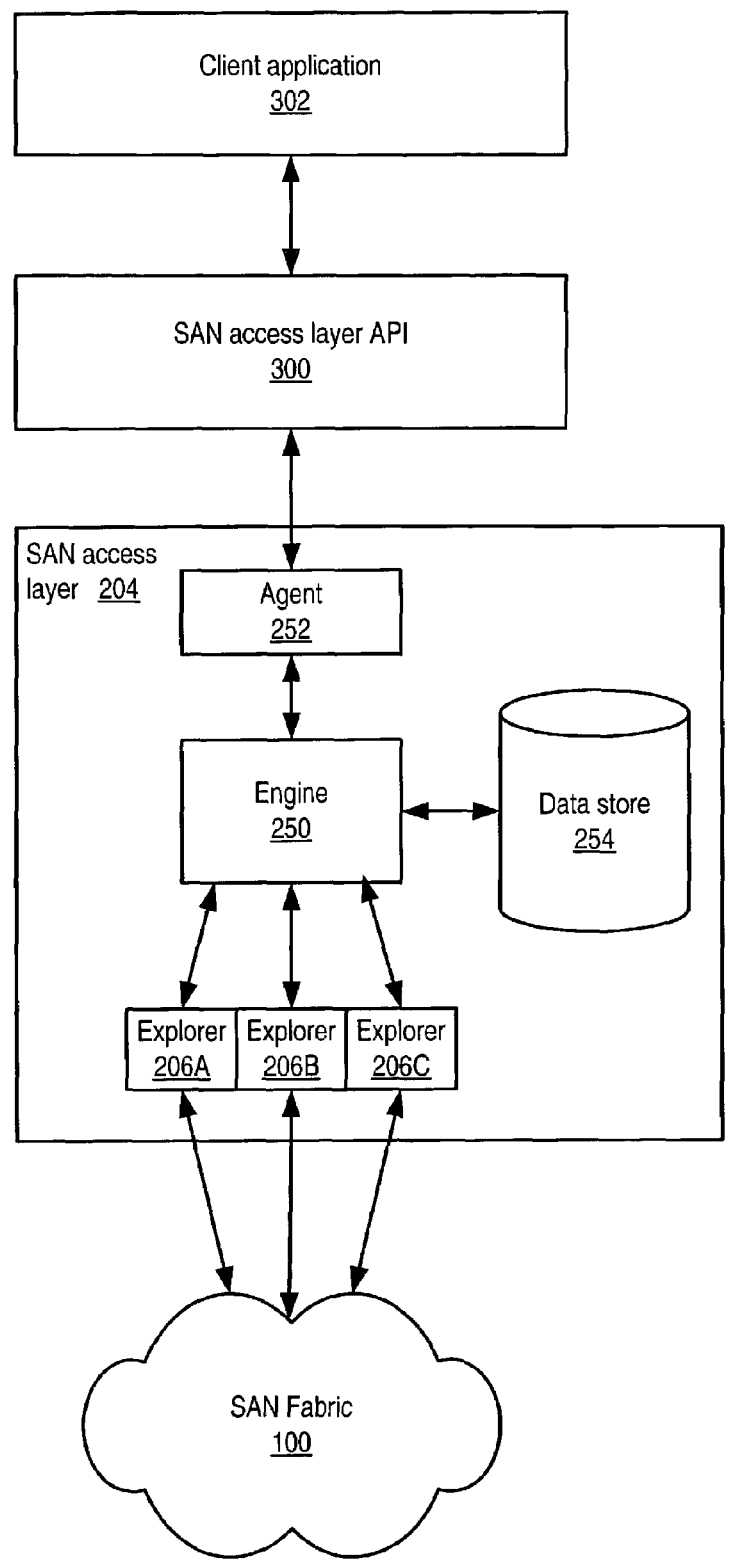
FIG. 4 illustrates the architecture of the SAN access layer according to one embodiment.

FIG. 4 illustrates the architecture of the SAN access layer 204 according to one embodiment. The SAN access layer 204 may include one or more components, including, but not limited to, one or more explorers 206 (e.g. explorers 206A, 206B, and 206C), an engine 250, an agent 252, and a data store 254. In one embodiment, the SAN access layer 204 may include an engine 250 that may perform one or more functions which may include, but are not limited to, coordinating the activity of the explorers 206, managing changes to the data store 254, and performing zoning operations by communicating with switches on the SAN fabric 100.

In one embodiment, the SAN access layer 204 may be configured for discovery and device communication through a configuration file. The configuration file may include one or more parameters for the SAN access layer 204 and/or globally to the explorers 206. In this example, a "delay" parameter may specify the time delay (e.g., in seconds) between executions of the explorers. Each type of explorer may have a section in the configuration file that may include one or more parameters specific to the particular type of explorer.

In one embodiment, the SAN access layer 204 may include one or more explorers 206 that provide an interface to different types of heterogeneous SAN components so that the SAN access layer 204 may provide a common data representation for heterogeneous SAN components to client applications 302 via the SAN access layer API 300. Explorers 206 may communicate with the SAN components over Fibre Channel (in-band) and/or Ethernet (out-of-band) connections to inventory the SAN. Each explorer 206 may communicate with a specific type of SAN component using a protocol available for that specific type of SAN component.

Explorers 206 may communicate with the SAN components over Fibre Channel (in-band) and/or Ethernet (out-of-band) connections to inventory the SAN. Each explorer 206 may communicate with a specific type of device, using a protocol available for that specific type of device. In one embodiment, the SAN access layer 204 may aggregate information gathered by the explorers 206 into a SAN access layer 204 data store. Once the SAN is discovered, the SAN access layer 204 may continue to monitor the SAN. In one embodiment, the SAN access layer 204 may periodically examine the SAN for objects that are added, objects that are removed, and connections that are pulled. In one embodiment, new explorers 206 may be added as needed or desired. For example, if a new type of SAN device is added to the SAN, or an existing type of SAN device is modified or upgraded, an explorer 206 may be added or updated to correctly communicate with the new or updated type of SAN device.

Each explorer 206 may use a different method to discover information about objects on the SAN. Explorers 206 may be categorized into types, including, but not limited to, switch explorers, zoning explorers, disk array explorers, and Host Bus Adapter (HBA) explorers. In one embodiment, the explorers 206 may query objects on the SAN to retrieve a standard set of attributes for each type of object. The terms "information" and "details" may be used to describe the different kinds of data about a SAN that the SAN access layer 204 may discover, including, but not limited to, SAN events, zone memberships, connectivity, etc. The term "attributes" refers to a subset of that larger body of information. Attributes are details that are particular to a type of object, such as a switch—details such as its vendor, model number, firmware version, port count, World Wide Name (WWN), and out-of-band address.

Switch explorers may discover switch information such as vendor name, firmware version, and model name. Switch explorers may include, but are not limited to, a management server explorer and an out-of-band switch explorer.

In one embodiment, the SAN access layer 204 may include a management server explorer to communicate with supported switches over Fibre Channel connections. In one embodiment, the management server explorer may use the Fibre Channel Common Transport (CT) protocol to communicate with switches in the SAN fabric 100. The management server explorer may, for example, discover switches in-band over Fibre Channel, obtain switch characteristics, and/or explore port connectivity. In one embodiment, the management server explorer may optionally run over IP networks, for example to discover Brocade fabrics. For some switches such as Brocade switches, the management server explorer may run out-of-band. In one embodiment, the management server explorer may also perform in-band zoning (e.g. for McDATA switches).

In one embodiment, there may be circumstances in which out-of-band exploration may be desired, for example, when there are multiple switch fabrics (e.g. McDATA switch fabrics) or unsupported HBA drivers. In one embodiment, the SAN access layer 204 may include an out-of-band switch explorer to communicate with switches (or their proxies) over Ethernet. In one embodiment, the out-of-band switch explorer may discover devices managed over any IP network. In one embodiment, the out-of-band switch explorer may use SNMP (Simple Network Management Protocol). SNMP is a protocol for monitoring and managing systems and devices in a network. The data being monitored and managed is defined by a MIB (Management Information Base), the specification and formal description of a set of objects and variables that can be read and possibly written using the SNMP protocol. Some embodiments may use other network protocols, for example Common Management Information Protocol (CMIP), Remote Monitoring (RMON), etc. Enabling the out-of-band switch explorer may include specifying IP addresses for each switch (or for multiple switch fabrics, each proxy) in a SAN access layer configuration file.

Embodiments of the SAN access layer 204 may include zoning explorers that may be used as an interface for the SAN access layer 204 to communicate with fabric switches to perform discovery and control of zones in the SAN. When zoning commands are issued (e.g. by a client application 302 via SAN access layer API 300), the SAN access layer 204 may use a zoning explorer to contact the switch to perform the zoning operation. In one embodiment, the zoning explorers may communicate with the switches out-of-band. Embodiments may provide zoning explorers specific to fabric switches provided by various switch vendors such as QLogic, INRANGE, McDATA and Brocade. In one embodiment, one or more zoning explorers (e.g., a Brocade zoning explorer) may complete transactions with a switch management server (name server) to discover zone names and attributes and to perform switch zoning commands. In one embodiment, the management server explorer may, in addition to discovery, also manage zoning for some vendors' switches in-band, for example, McDATA switches.

In one embodiment, the SAN access layer 204 may include an HBA explorer that may discover information about SAN-connected storage devices 104 that are zoned to a host. The HBA explorer may interact with a host (e.g. a Sun Solaris or Windows 2000/Windows NT Server) to discover HBAs and device paths. A device path may be defined as a route through an interconnect that allows two (or more) devices to communicate. In one embodiment, the HBA explorer may not discover locally attached storage (e.g. disks or other devices attached through a SCSI or IDE controller). If these storage devices have OS handles, then the HBA explorer may return LUN names and attributes. An OS handle is the name the operating system uses to identify a storage resource (known as an Addressable Unit, or AU), and the correct methods (e.g.

driver/system call) to access the storage resource. If no OS handles are available, then the HBA explorer may identify the device as a generic device (a block device attached to a port on the host).

Embodiments of the SAN access layer 204 may include one or more disk array explorers that may provide information about array names and their attributes, such as number of ports and the number of disks contained in an array. Disk array explorers may discover disk arrays/enclosures and their LUNs. Disk array explorers may pass along LUN management commands to the array's management interface to execute. In one embodiment, disk array explorers may discover LUNs that are not masked to discovered hosts on the SAN. The SAN access layer 204 may include disk array explorers specific to disk arrays of various vendors, including, but not limited to, Compaq, EMC, and Hitachi disk arrays.

In one embodiment, the SAN access layer 204 may not communicate directly with a disk array but instead may communicate through the array's management interface, for example, Command Scriptor (Compaq) and SYMCLI (EMC). In one embodiment, the array vendor's management software is installed on a host 102 with an in-band connection to the arrays to be managed. The management software may provide a unified interface/command interpreter between the SAN access layer 204 and the arrays on the fabric.

In one embodiment, disk array explorers (e.g. Compaq and EMC explorers) may start when the SAN access layer 204 starts. In one embodiment, the disk array explorers may check to see if the host has the management interfaces (e.g. CCS or SYMCLI). If the host does not have the management interface, then the corresponding explorer may be disabled. If the management interfaces are present, then the explorers may attempt to determine if the host has access to any LUNs exported by the array. If any LUNs are available, the explorers may attempt to discover the array using the OS handle to the LUN.

In one embodiment, some disk array explorers (e.g., a Hitachi explorer) may use a different model than other explorers such as Compaq and EMC explorers. Going out-of-band, these explorers may use a network protocol such as SNMP to communicate directly with the disk array controller (e.g. the Hitachi disk array controller). IP addresses for each disk array may be supplied for SAN access layer 204 discovery and communication. For example, in one embodiment, for the SAN access layer 204 to discover and make LUN management requests using the Hitachi explorer, the IP addresses of an agent (e.g. SNMP agent) residing on each Hitachi disk array may be specified in a SAN access layer 204 configuration file.

In one embodiment, the SAN access layer 204 may automatically discover information for each Addressable Unit (LUN) that is under the control of a volume manager. The discovered information may include, but is not limited to: Disk Group Name, Disk Media Host, Disk Media I/O Paths, Disk Media Public Capacity, and Disk Name.

In one embodiment, data gathered by the explorers 206 may be aggregated into data store 254, which may be updated with real-time information about objects on the SAN. Once the SAN is discovered, the SAN access layer 204 may continue to monitor the SAN and may update the data store 254 as new events occur on the SAN. In one embodiment, the SAN access layer 204 may periodically examine the SAN, for example to discover or determine objects that are added, objects that are removed, and connections that are pulled. In one embodiment, the data store 254 may be managed by the SAN access layer engine 250. In one embodiment, the data store 254 may be an embedded, ODBC-compliant, relational database. In one embodiment, data from the database may be imported into a data warehouse to track changes and analyze the SAN over periods. In one embodiment, the data store 254 may be purged, for example when a fabric switch is rebooted or to capture fresh SAN discovery information. Purging the data store 254 may result in the loss of user-entered data such as manually configured hosts and object attributes. An alternative to purging the data store 254 is to delete individual objects, for example through a user of a client application 302 accessing the SAN access layer 204 via SAN access layer API 300. SAN objects that are discoverable by the SAN access layer 204 may be added back into the data store automatically.

In one embodiment, the SAN access layer 204 may include an agent 252 that may serve as an interface to functions provided by the SAN access layer. In one embodiment, the interface provided by the SAN access layer 204 agent may be a proprietary interface, for example for use by components of a SAN management system including the SAN access layer 204 such as the exemplary SAN management system described below. In one embodiment, the SAN access layer API 300 may provide access to a limited portion of the functionality available through the SAN access layer 204 interface to a client application 302. In one embodiment, each client application 302 may be given a key for accessing the SAN access layer 204 via the SAN access layer interface. In one embodiment, different client applications 300 may be given different keys which may be used to grant different levels of access to the SAN access layer 204 functions and/or access to different portions of the SAN access layer 204 functions to the client applications.

In one embodiment, the agent 252 may translate information from the data store 254 into formatted files (e.g. XML files), which may be provided to client applications 302 via SAN access layer API 300. The agent may also enforce user authentication for commands sent to the SAN access layer 204. In one embodiment the agent may handle communication between the SAN access layer 204 and one or more SAN access layer remotes such as those of the exemplary SAN management server described below.

The following is an example of the client application 302 requesting SAN data from the SAN access layer 204 according to one embodiment. The client application 302 may send a message or messages formatted according to the SAN access layer API 300 and requesting SAN data stored in data store 254. The SAN access layer API 302 may translate the message(s) received from the client application 302 into a markup language (e.g. XML) message or messages formatted in accordance with the SAN access layer 204. The SAN access layer API 300 may open a connection (e.g. TCP/IP socket) with the SAN access layer agent 252 and send the message(s), which may request the SAN data stored in the data store 254. Upon receiving the request, the SAN access layer engine 250 may dynamically create a document (e.g. an XML document) including the requested SAN data, for example SAN data describing at least a portion of the SAN topology. The SAN access layer agent 252 then may send this document in a markup language message or messages formatted according to the SAN access layer 204 to the SAN access layer API 300. The SAN access layer API 300 may then translate the received message(s) into one or more SAN access layer API message(s). The SAN access layer API 300 may then send these messages to the client application 302. Once the client application 302 successfully receives the message(s), the SAN access layer API 300 and/or the SAN access layer agent 252 may close the connection. When the client application 302 receives the message(s), it may read the data and display, in graphical and/or textual format, the SAN data included in the message(s).

Since not all objects on the SAN may be visible to the host on which the SAN access layer 204 is installed, one embodiment may include a SAN access layer remote that may be installed on one or more other hosts in the SAN, if any, to assist the SAN access layer 204 in discovering the entire SAN. In one embodiment, a SAN access layer remote may be installed on every host on the SAN to provide complete and accurate discovery. In one embodiment, the SAN access layer remote may be a modified form of the SAN access layer 204. In one embodiment, the SAN access layer API 300 may interact with the SAN access layer 204 to collect information and/or issue commands related to the SAN access layer remote(s).

In one embodiment including SAN access layer remotes, each installation of the SAN access layer remote may include one or more explorers 206. In one embodiment, explorers 206 of the SAN access layer remotes may include one or more explorers 206 that may also be used by the SAN access layer 204, such as a management server explorer and an HBA explorer. In one embodiment, these explorers 206 may also include an out-of-band switch explorer. In one embodiment, the SAN access layer 204 and each installation of the SAN access layer remote may each include a set of one or more explorers 206 that may be determined by the discovery requirements and/or contents of the region of the SAN visible to the host on which the SAN access layer 204 or SAN access layer remote resides. Each installation of the SAN access layer remote may provide information gathered by its explorers 206 to the SAN access layer 204, which may aggregate this information into the SAN access layer 204 data store. Installed SAN access layer remotes may be considered agents or extensions of the SAN access layer 204. Where SAN access layer 204 is described herein, the description may generally be considered to include the SAN access layer remotes.

Figure 5:
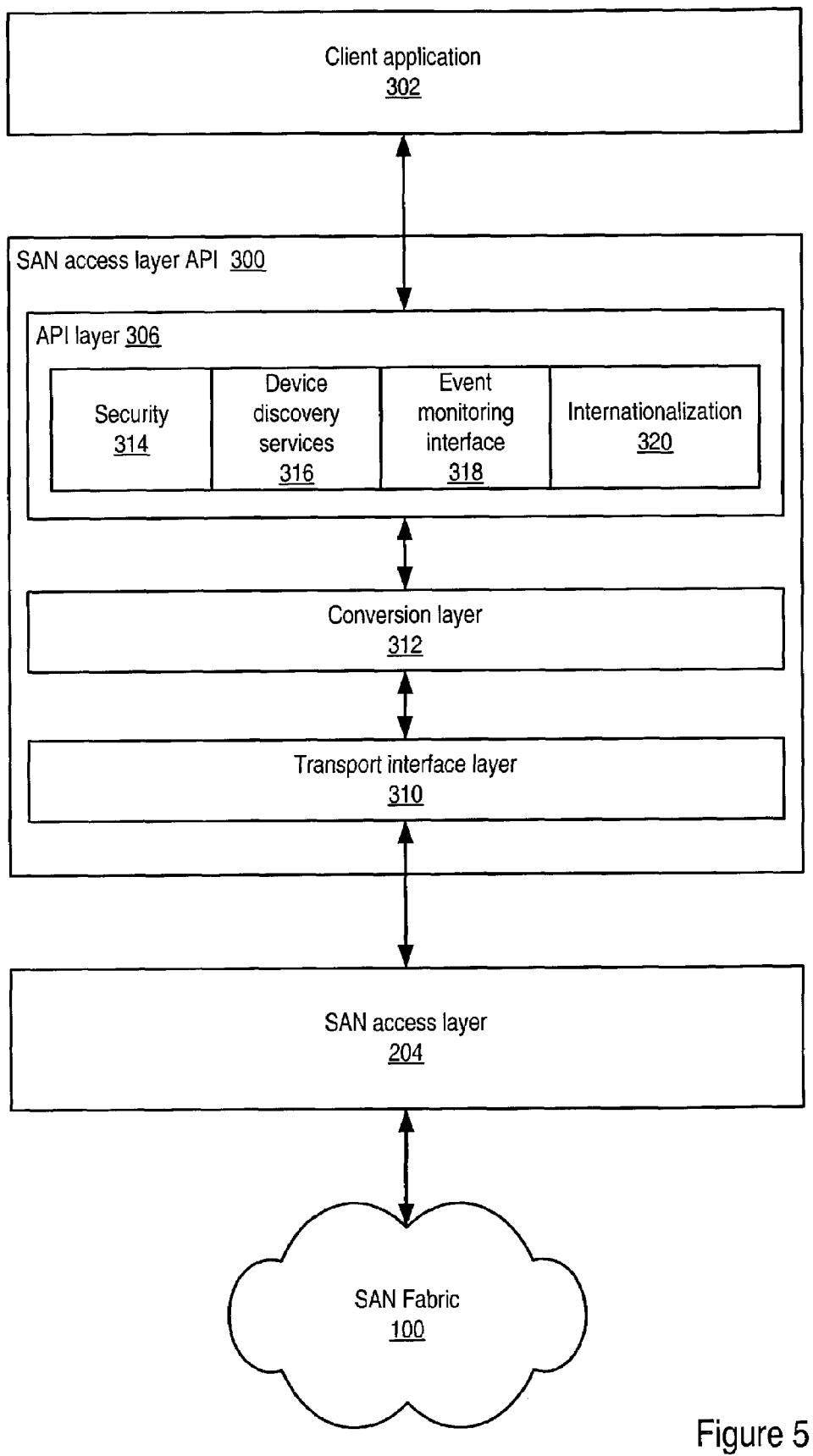
FIG. 5 illustrates the architecture of the SAN access layer API according to one embodiment.

FIG. 5 illustrates the architecture of the SAN access layer API 300 according to one embodiment. In one embodiment, the SAN access layer API 300 may include an API layer 306 that may include various software modules for invoking functionality of the SAN access layer 204. In one embodiment, the API layer 306 may include one or more of, but is not limited to, software modules for performing security functions 314, software modules for providing device discovery services 316, software modules for performing event monitoring 318, and software modules for performing internationalization functions 320. Other embodiments may include modules for invoking other functions of the SAN access layer 204. In one embodiment, the SAN access layer API 300 may include a conversion layer 312 for converting SAN access layer API 300 messages received from client application 302 to messages formatted according to the SAN access layer 204 protocol (e.g. XML protocol) and vice versa. In one embodiment, the SAN access layer API 300 may include a transport (e.g. HTTP transport) interface layer 310 for establishing connections with SAN access layer 204 and for sending and receiving messages to SAN access layer 204.

Embodiments of the API layer 306 of the SAN access layer API 300 may include software modules invokable by client applications 302 through messages formatted according to the SAN access layer API 300. In one embodiment, the software modules may include one or more of, but are not limited to, software modules for creating a connection to the SAN access layer agent and closing a connection to the SAN access layer agent. In one embodiment, these software modules may include one or more of, but are not limited to, security-related software modules for adding a user to the SAN access layer authentication domain and deleting a references to a user in the SAN access layer authentication domain. In one embodiment, the software modules may include one or more of, but are not limited to, zone and LUN security-related software modules for creating a new zone and adding objects to the zone, adding one or more objects to an existing zone, deleting a zone, moving one or more objects from one zone to another, removing one or more objects from a zone, renaming an existing zone, creating a new zone alias and adding objects to the zone alias, deleting a zone alias, moving one or more objects from one zone alias to another, removing one or more objects from a zone alias, renaming an existing zone alias, granting or revoking permissions to access LUNs from HBAs, and establishing or removing bindings in arrays. In one embodiment, the software modules may include one or more of, but are not limited to, zone and LUN event-related software modules for registering the invoking client application 302 to receive events and to stop listening for events. In one embodiment, the software modules may include one or more of, but are not limited to, discovery-related software modules for creating a localized namespace for standard SAN access layer attributes, freeing memory allocated for attribute-value arrays, getting a list of all objects of a specified types, including their attributes, getting a list of all the objects of a given type including their attributes, gets the container(s) of an object in the SAN access layer 204, and getting a list of objects given their SAN access layer object identifier.

The following describes the operation of a SAN access layer according to one embodiment. In one embodiment, the SAN access layer API 300 may receive a request from client application 302 formatted in accordance with the SAN access layer API 300 and invoking one or more of the software modules of the API layer 306 to perform one or more functions of the SAN access layer 204. The conversion layer 312 of the SAN access layer API 300 converts the request into markup language (e.g. XML) message(s) formatted in accordance with the SAN access layer 204. The transport interface layer 310 of the SAN access layer API 300 then creates a connection to the SAN access layer 204 (if necessary) and sends the markup language message(s) to the SAN access layer 204 on a network transport supported by the SAN access layer 204 (e.g. via TCP/IP to a socket of the SAN access layer 204). The SAN access layer 204 may then perform the requested task(s) as specified by the markup language message(s). Responses and/or results of the requested tasks may then be sent by the SAN access layer 204 to the transport interface layer 310 of the SAN access layer API 300 in one or more markup language (e.g. XML) messages formatted according to the SAN access layer 204. The conversion layer 312 of the SAN access layer API 300 may then parse the markup language message(s) received from the SAN access layer 204 and, the results and/or responses may be returned to the client application 302 by the SAN access layer API 300 in one or more messages formatted according to the SAN access layer API 300.

The following is a description of Logical Unit Number (LUN) security in general, as well as LUN security as supported by embodiments of the SAN access layer 204 accessed through the SAN access layer API 300. Ensuring that SAN applications have the required storage resources may include providing secure storage from storage devices (e.g., disk arrays, tape backup devices, etc.) to hosts within the SAN. Continuing with FIG. 5, in one embodiment, the SAN access layer 204 and SAN access layer API 300 may integrate storage masking from various array providers, for example Hitachi Data Systems, Compaq and EMC, to hosts in the SAN. LUN (Logical Unit Number) security is the collective name given to the operations involved in making storage device resources available to hosts on a SAN. In one embodiment of the SAN management system, LUN security may provide granular control over host access to individual LUNs within an array or other collection of potentially heterogeneous storage devices. LUN security may include LUN locating or searching, LUN binding, LUN masking, and fabric zoning. In one embodiment, a client application 302 may be used to manage LUN security for heterogeneous SAN components via the SAN access layer 204 and SAN access layer API 300.

A LUN (logical unit number) is the SCSI (Small Computer System Interface) identifier of a logical unit within a target, the system component that receives a SCSI I/O command. A logical unit is an entity within a SCSI target that executes I/O commands. SCSI I/O commands are sent to a target and executed by a logical unit within that target. A SCSI physical disk may have a single logical unit, or alternatively may have more than one logical unit. Tape drives and array controllers may incorporate multiple logical units to which I/O commands can be addressed. Each logical unit exported by an array controller corresponds to a virtual disk.

Figure 6:
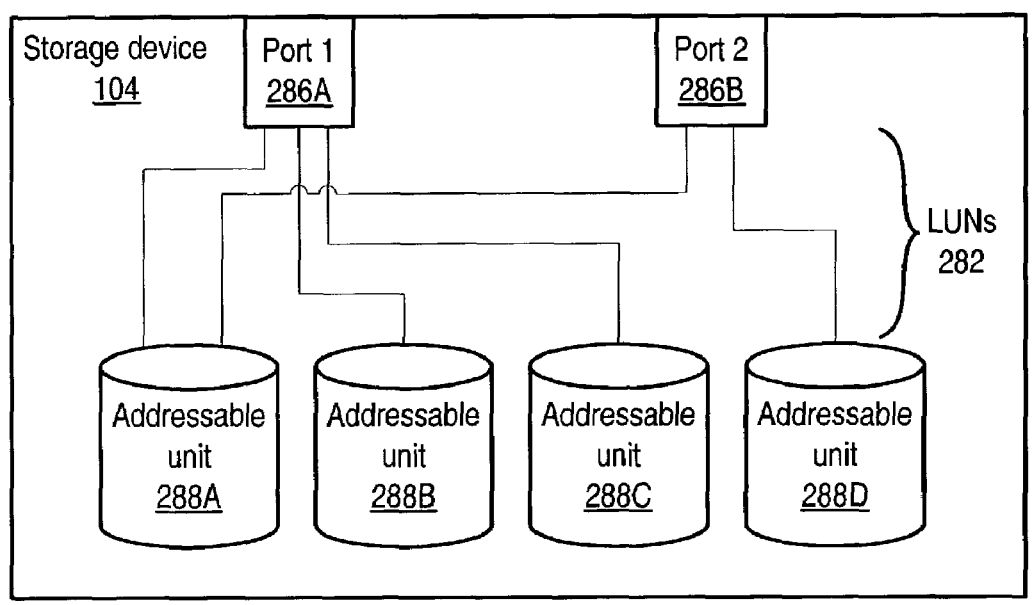
FIG. 6 illustrates LUN binding according to one embodiment.

LUN security may include LUN binding, the creation of access paths between an addressable unit (which may also be referred to as an AddrUnit, an AU, a unit, a volume, a logical unit, a logical disk, or a logical device) within a disk array and a port on the array. FIG. 6 illustrates LUN binding according to one embodiment. In the LUN binding process, an AU 288 is bound to a specified array port 286 (e.g. array port 286A or 286B) in a specified storage device 104 (e.g. a storage system/ disk array)). This results in the creation of a LUN 282. AUs 288A, 288B, 288C, and 288D are storage volumes built out of one or more physical discs within the storage device 104. Array ports 286A and 286B are connected to the SAN fabric 100 and function as SCSI targets behind which the AUs 288 bound to those ports 286 are visible. "LUN" is the term for the access path itself between an AU 288 and an array port 286, so LUN binding is actually the process of creating LUNs 282. However, a LUN 282 is also frequently identified with the AU 288 behind it and treated as though it had the properties of that AU 288. For the sake of convenience, a LUN 282 may be thought of as being the equivalent of the AU 288 it represents. Note, however, that two different LUNs 282 may represent two different paths to a single volume. A LUN 282 may be bound to one or more array ports 286. A LUN 282 may be bound to multiple array ports 286, for example, for failover, switching from one array port 286 to another array port 286 if a problem occurs.

Figure 7:
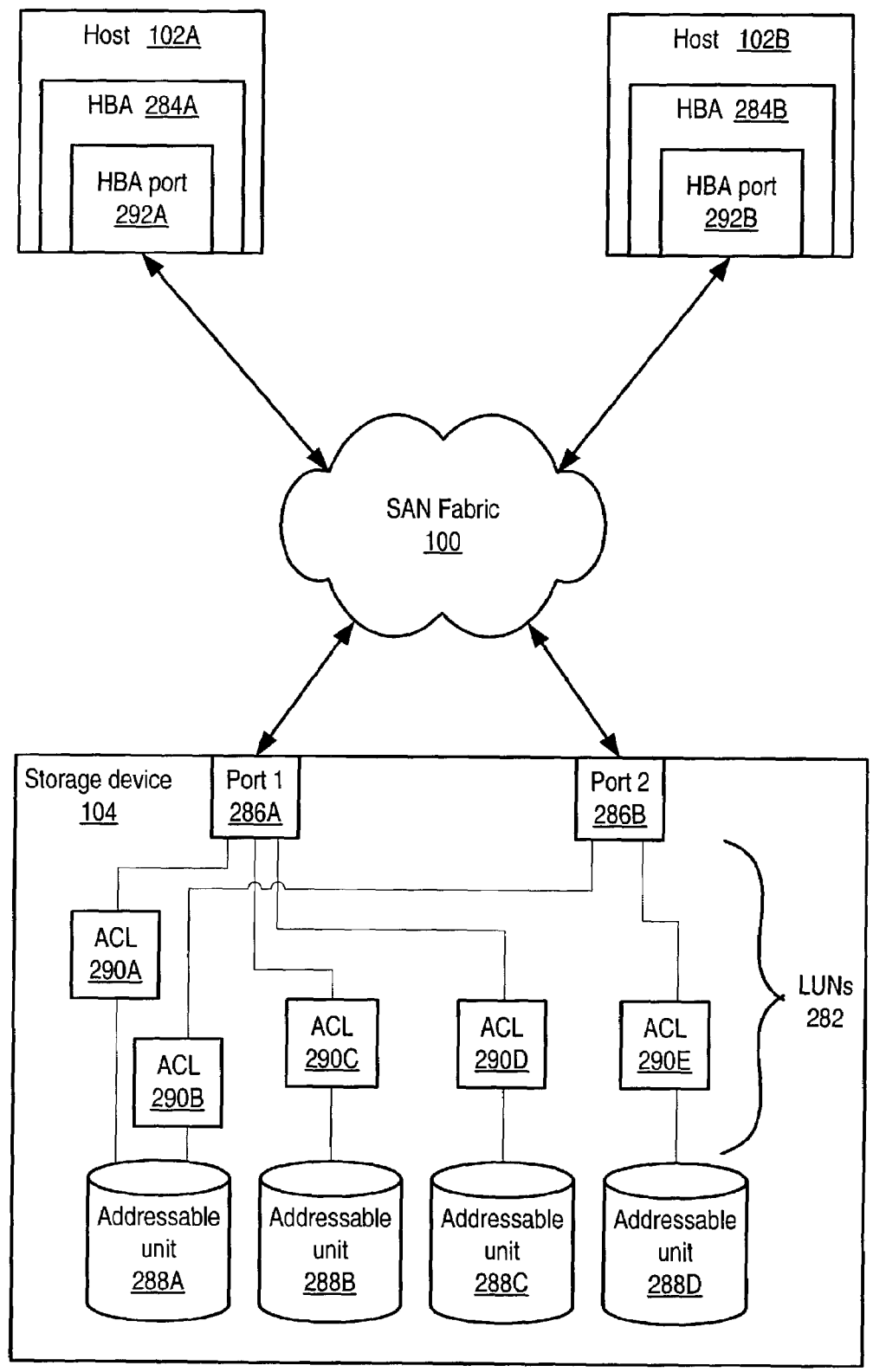
FIG. 7 illustrates LUN masking according to one embodiment.

LUN security may also include LUN masking to enable access to a particular Addressable Unit for a host on the SAN. FIG. 7 illustrates LUN masking according to one embodiment. LUN masking is a security operation that indicates that a particular host 102 (e.g. host 102A or 102B), HBA (Host Bus Adapter) 284 (e.g. HBA 284A or 284B), or HBA port 292 (e.g. HBA port 292A or 292B) is able to communicate with a particular LUN 282. In the LUN masking process, a bound AU 288 (e.g. AU 288A, 288B, 288C or 288D) may be masked to a specified HBA port 292, HBA 284, or host 102 (e.g. all HBAs on the host) through a specified array port 286 in a specified storage device 104. When an array LUN 282 is masked, an entry is added to the Access Control List (ACL) 290 (e.g. ACL 290A, 290B, 290C, 290D, or 290E) for that LUN 282. Each ACL 290 includes the World Wide Name of each HBA port 292 that has permission to use that access path that is, to access that AU 288 through the particular array port 286 represented by the LUN 282.

LUN masking may be thought of as the removal of a mask between an AU 288 and a host 102 to allow the host to communicate with the LUN 282. The default behavior of the storage device 104 may be to prohibit all access to LUNs 282 unless a host 102 has explicit permission to view the LUNs 282. The default behavior may depend on the array model and, in some cases, the software used to create the AU 288.

Figure 8:
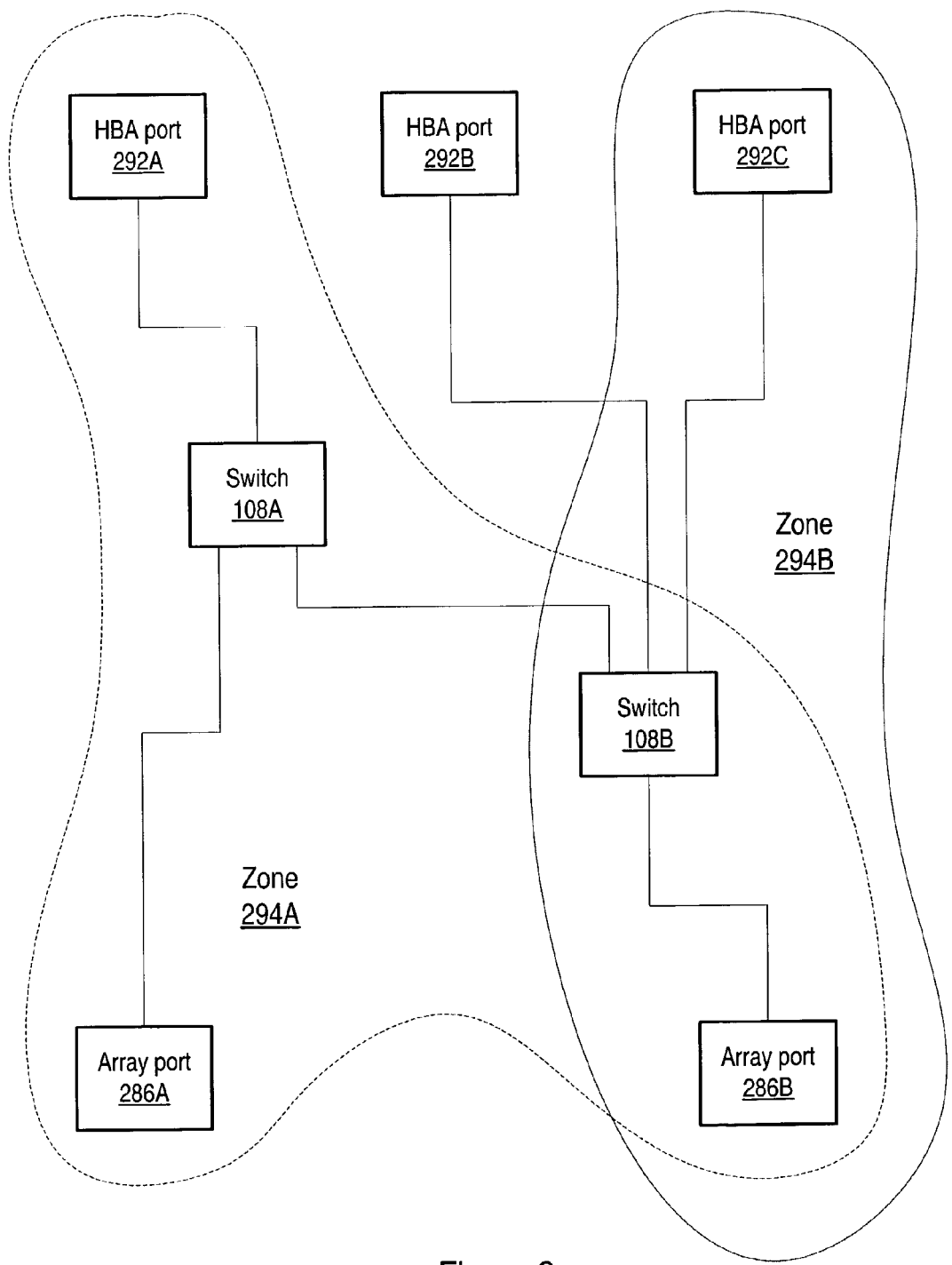
FIG. 8 illustrates fabric zoning according to one embodiment.

LUN security may also include fabric zoning. FIG. 8 illustrates fabric zoning according to one embodiment. After a LUN is masked to an HBA port 292 (e.g. HBA port 292A, 292B or 292C) in a host, the zoning configuration of the SAN fabric 100 may still prevent the host from accessing the AU behind that LUN. In order for the host to see the AU and create an Operating System (OS) handle for it, there must be at least one zone on the fabric 100 that contains both the HBA port 292 (e.g. HBA port 292A, 292B or 292C) and the array port 286 (e.g. array port 286A or 286B) to which the AU is bound. A zoning operation may be required if the HBA port 292 and array port 286 are not already zoned together. Zoning operations may include creating a new zone 294 and adding the array port 286 and the HBA port 292 to an existing zone 294. Zones 294 may also include one or more ports on one or more fabric devices (e.g. switches 108A and 108B) in the device path between the array port 286 and the HBA port 292. Fabric zoning occurs at the level of individual nodes or ports attached to the SAN fabric. Zones and their member objects may be defined in zoning tables within the switches 108 on the SAN fabric. When zoning is implemented on a SAN fabric, the switches 108 consult the zoning table to determine whether one object is permitted to communicate with another object, and restrict access between them unless they share a common membership in at least one zone.

In FIG. 8, zone 294A includes HBA port 292A, the array ports 286A and 286B through which HBA port 292A may access LUNs bound to the array ports 286, and the switch ports on switches 108A and 108B through which HBA port 292A and array ports 286 are coupled. Zone 294B includes HBA port 292C, array port 286B through which HBA port 292C may access LUNs bound to the array port 286B, and the switch port(s) on switch 108B through which HBA port 292C and array port 286B are coupled. HBA ports 292A, 292B and 292C may be on the same host or on different hosts and, if on the same host, on the same HBA or on different HBAs. Array ports 286A and 286B may be on the same storage system or on different storage systems. For more information on zoning, see the description of zoning above.

Figure 9:
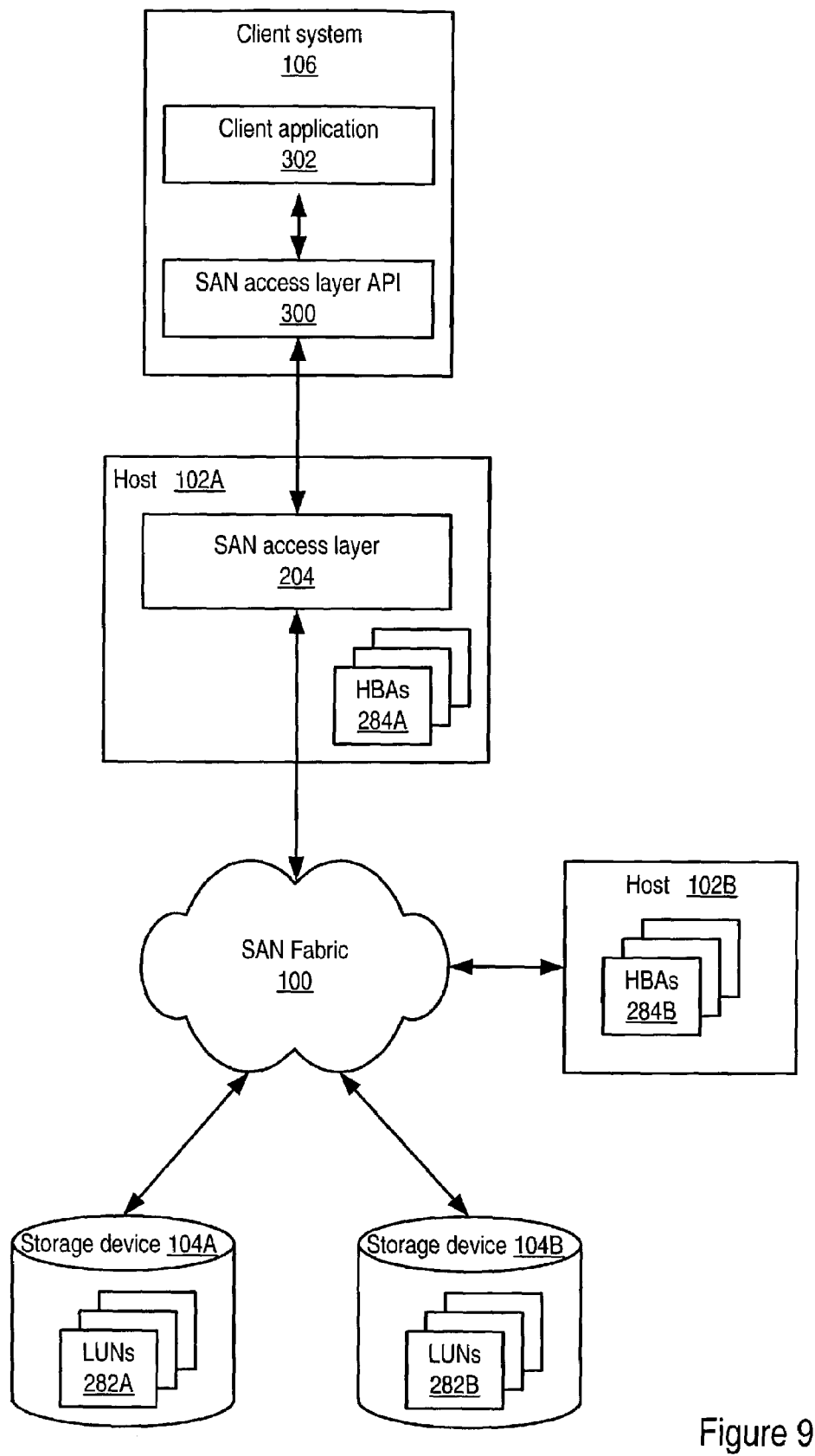
FIG. 9 illustrates a client application providing LUN security and/or zoning operations through a SAN access layer and SAN access layer API according to one embodiment.

In one embodiment as illustrated in FIG. 9, a client application 302, via the SAN access layer API 300 of the SAN access layer 204, may discover SAN components including, but not limited to, one or more storage devices 104 (e.g. storage devices 104A and 104B) each including one or more addressable storage units and one or more fabric ports for coupling to the SAN, and one or more host systems 102 each including one or more host bus adapters (HBAs) 284 which each provide host adapter ports for coupling to the SAN. The client application 302 may provide a user interface for selecting addressable storage units to be made available to selected host adapter ports accessed via the SAN access layer API 300 of the SAN access layer 204, and may communicate with the SAN access layer 204 via the SAN access layer API 300 to create access paths between selected addressable storage units and selected fabric ports of the storage systems, enable access to the selected addressable storage units for the selected host adapter ports, and/or zone the selected storage system fabric ports in a common fabric 100 zone with the selected host adapter ports.

The following is a description of zoning of SAN objects in general, as well as zoning as supported by embodiments of the SAN access layer 204 accessed through the SAN access layer API 300. The flexible connectivity capabilities of the SAN storage model may pose security risks. Zoning helps alleviate that risk by providing a means of controlling access between objects on the SAN. By creating and managing zones, the user may control host 102 access to storage resources. Continuing with FIG. 9, in one embodiment, a client application 302 may access the SAN access layer 204 through the SAN access layer 306 API to create and manage zones of SAN objects, including zones of heterogeneous components.

A zone is a set of objects within a SAN fabric 100 that can access one another. Zones and their member objects may be defined in zoning tables within the switches on the SAN fabric 100. When zoning is implemented on a SAN fabric 100, the switches consult the zoning table to determine whether one object is permitted to communicate with another object, and restrict access between them unless they share a common membership in at least one zone.

Fabric zoning occurs at the level of individual nodes or ports attached to the SAN fabric 100. Zoning-enabled fabrics may include zoning tables that define each zone along with its member objects. These zones function similar to virtual private networks (VPNs) on traditional networks.

There may be one or more ways to use zoning to improve the security and organization of the SAN. Examples of uses of zoning include, but are not limited to: isolating storage resources for different operating environments, such as separating UNIX storage from Windows NT storage; setting aside resources for routine backups; securing areas of the SAN for storage of sensitive data; and creating dedicated resources for closed user groups.

In one embodiment, the SAN access layer 204 may provide methods, accessible by client applications 302 through the SAN access layer API 300, to enforce the access restrictions created by zones on the SAN. These methods may include two methods that correspond to the forms of zoning commonly referred to as soft zoning and hard zoning.

Soft zoning, also called advisory zoning, may be enforced simply by filtering the visibility of objects on the SAN so that an object can only see other objects that share at least one zone membership with the object. At boot time, a SAN host 102 or device requests a list of the World Wide Names (WWNs) on the SAN fabric 100 from the fabric Name Service. The Name Service may consult the zoning table and filter out of its response any WWNs that are not zoned together with the host 102 or device making the request. In this way, a host 102 on the SAN is only made aware of devices whose WWNs are zoned together with the host's HBA port. Soft zoning is flexible because it does not rely on an object's physical location on the SAN. If its physical connection to the SAN fabric 100 changes, its zone memberships remain intact because the zone memberships are based on the WWNs of the object's ports. However, soft zoning may have security vulnerability in that it does not actively prevent access between objects that belong to different zones. Even if the Name Service does not supply a SAN host 102 with the WWN of a device that is zoned away from the host 102, a user who knows that WWN (or a hacker trying different combinations of addresses) may still send Fibre Channel packets from the host 102 to that device.

When hard zoning is implemented, a Fibre Channel switch may actively block access to zone members from any objects outside the zone. This may be performed at the level of ports on the switch. Hard zoning may also be referred to as switch port zoning. The switch checks each incoming Fibre Channel packet against its routing table to see whether the packet may be forwarded from the entry port to its destination port. Switch port zoning offers strong security because it actively segregates zone members from the rest of the SAN fabric 100. However, hard zoning may lack the flexibility of soft zoning, since an object attached to a zoned switch port loses its zone membership when it is physically disconnected from that switch port and moved elsewhere on the SAN. New objects attached to the switch port may inherit the zone memberships of that port, so planning and record keeping by the administrator may be needed to avoid breaks in security when moving objects around on the SAN.

In one embodiment, the SAN access layer 204 may support the zoning of objects on the SAN including, but not limited to, switch ports, hosts 102, and storage devices 104 including, but not limited to, storage arrays, JBODs, and individual storage devices. In one embodiment, the SAN access layer 204 may support switch zoning though application program interfaces (APIs) provided by switch vendors, allowing for both hard (port-level) and soft (advisory, WWN) zoning. In one embodiment, zoning may be implemented and used by storage administrators using one or more client applications 302 which may provide services, tools and/or utilities for allocating storage resources and managing SAN security via the SAN access layer API 300 of the SAN access layer 204. In one embodiment, a client application 302 may serve as a centralized point from which a manager or other user may access the SAN access layer 204 via the SAN access layer API 300 to create and manage zones on the SAN, including zones containing heterogeneous SAN objects.

In one embodiment, the client application 302 may facilitate the creation, modification, and deletion of zones via the SAN access layer API 300 of the SAN access layer 204. The client application 302 may provide storage zone definition, creation and management. The client application 302 may be used to administer zones directly and visually; and may reduce or remove the need to use telnet commands or proprietary, hardware-specific Web-based solutions. The client application 302 may facilitate the creation of new zones and edits to existing zones. The client application 302 may automatically filter the list of objects on the SAN and present a list of objects that are available to be added to a zone. In one embodiment, an object may be zoned based on the World Wide Name (WWN) of the object node, the WWN of an individual port under the object node, or the switch port to which the object is attached. In one embodiment, users may administer zoning though the zone utility or optionally through a command line interface.

There may be no industry-wide standard for zoning, and thus different vendors' switches may implement switch zoning in different ways. Thus, one embodiment of the SAN access layer 204 and SAN access layer API 300 may use a switch-neutral approach to zoning. This embodiment may not specify, for example, whether hard zoning (port-level zoning) or soft zoning (based on WWNs) should be applied in any particular case. In this embodiment, implementation details such as these may be left up to the switch vendor.

In one embodiment, a client application 302, via the SAN access layer 204 and SAN access layer API 300, may provide datapath zoning control for interconnects from vendors such as Brocade, QLogic, and McDATA to abstract the individual interconnects' complex zoning tools to simplify creating, adding to, and deleting zones.

Exemplary SAN Management System

Figure 10:
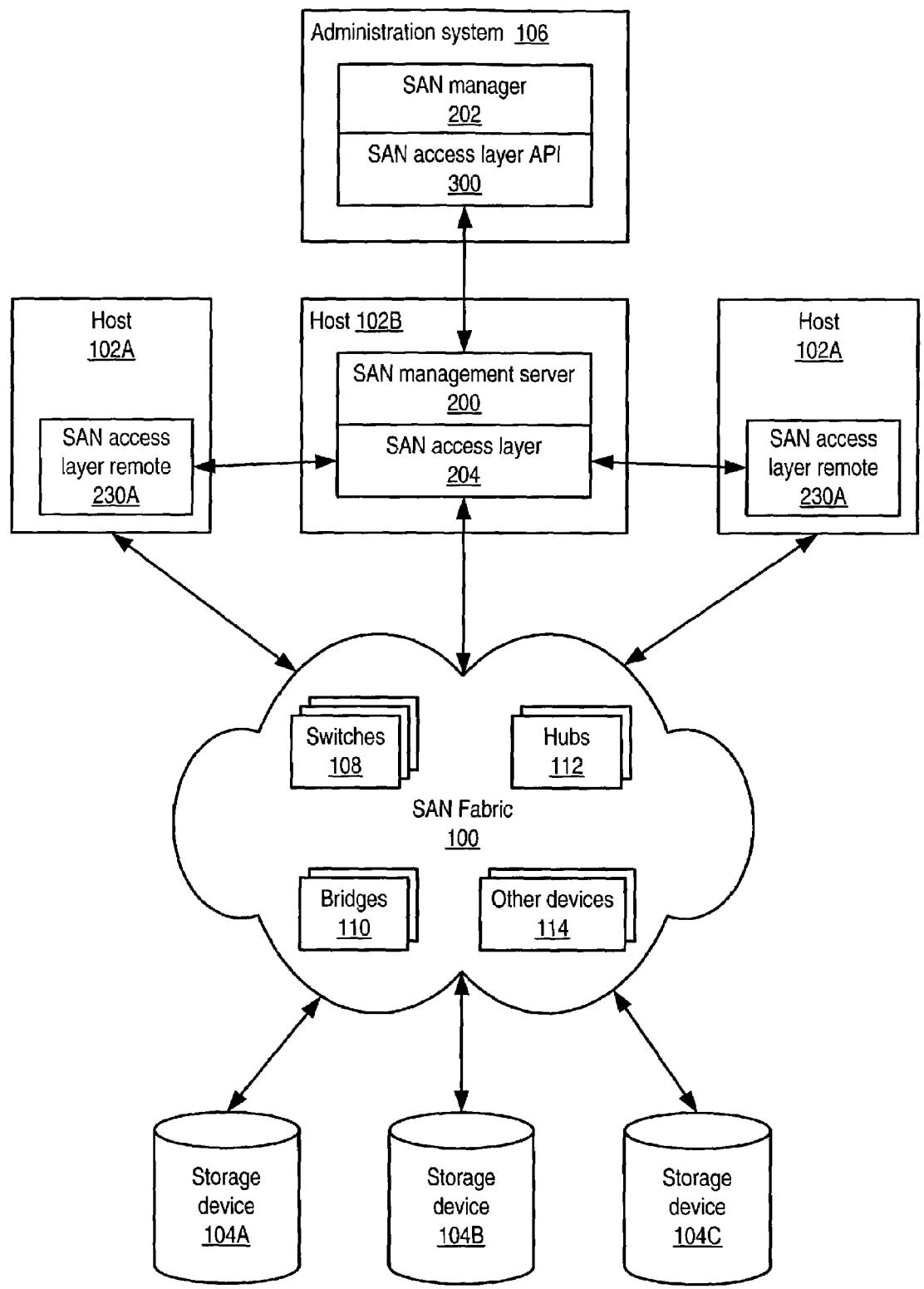
FIG. 10 illustrates an exemplary SAN management system including a SAN access layer and SAN access layer API according to one embodiment.

FIG. 10 illustrates an exemplary SAN management system in which embodiments of a SAN access layer and SAN access layer API as described herein may be implemented. In one embodiment, the SAN management system may provide administrators or other users the ability to view complex SAN topologies, gather real-time information about SAN objects, and support zoning and LUN security from one central point. This embodiment may be based on a distributed client-server architecture, and which may include a SAN management server 200, a SAN access layer 204, a client application acting as a SAN manager 202, and a SAN access layer API 300. In one embodiment, the SAN access layer 204 may be a component or "layer" of the SAN management server 200.

The SAN management server 200 may provide discovery of SAN objects and their attributes, event and policy management, and/or notification services. The SAN management server 200 may explore the SAN to make data available to client applications. The functions of the SAN management server 200 may include one or more of, but are not limited to: automatically discovering SAN-attached objects including hosts, host bus adapters (HBAs), switches and storage devices; maintaining a data store/database of real-time object information; managing SAN resources through zoning and LUN access control; monitoring conditions on the SAN; performing policy-based actions in response to SAN conditions; generating inventory and performance reports; and supporting user-defined grouping of objects based on quality of service (QoS) criteria. Embodiments of the SAN management server 200 may run in a variety of systems, including, but not limited to, Solaris 2.6, 7 or 8, Microsoft Windows NT 4.0 (Server and Enterprise Server), and Microsoft Windows 2000 (Server, Advanced Server and Datacenter Editions).

SAN management system administration may include determining that the SAN management server 200 is configured to discover and monitor devices on the SAN. In one embodiment, the SAN management system may provide discovery methods that require minimal maintenance, and may provide a SAN configuration utility.

In one embodiment, the SAN management system may include a SAN access layer 204 including one or more explorers that may provide an interface to different types of heterogeneous SAN components so that the SAN management system may provide a common data representation for the heterogeneous SAN components. One embodiment may include one or more SAN access layer remotes 230 which each may include one or more explorers. In one embodiment, client applications may access the SAN access layer 204 through a SAN access layer API 300. In one embodiment, each client application may have a corresponding SAN access layer API 300 through which it may access the SAN access layer 204. In one embodiment, one or more components of the SAN management system, such as one or more components of the SAN management server 200 (e.g. an alarm service, a policy service, etc.) may access the SAN access layer 204 via a SAN access layer API 300.

The SAN manager 202 is a client application provided with the SAN management system. The SAN manager 202 may provide an interface for taking advantage of many or all of the SAN management system capabilities. In one embodiment, the SAN manager 202 provides a graphical user interface for displaying the information (e.g. XML data) compiled by and received from the SAN access layer 204 via SAN access layer API 300 and/or other components of the SAN management server 200 in graphical and/or textual format. The SAN manager 202 may be a central point for the user to perform one or more of SAN management task including, but not limited to, administering the SAN, viewing topographical displays of discovered objects on the SAN, accessing detailed information on components including object attributes and connectivity, creating and modifying policies, administering access control through zoning and LUN security, monitoring SAN events including real-time alerts, allocating storage resources, generating and viewing inventory and performance reports, generating and viewing real-time and historical reports, and/or launching utilities, tools and applications, which may include third-party management tools.

Embodiments of the SAN manager 202 may provide a user interface for various tools, utilities and/or functions of the SAN management system. Embodiments of the SAN manager 202 may include an enclosure utility for creating and managing SAN object enclosures. Embodiments of the SAN manager 202 may include a zone utility for simplified zoning management. Embodiments of the SAN manager 202 may include a policy utility for configuring automated responses to SAN conditions. Embodiments of the SAN manager 202 may include a reporter mechanism for generating and displaying user-defined and/or predefined reports on various aspects of the SAN. Embodiments of the SAN manager 202 may include a group utility for defining and naming groups of SAN objects based on quality of service (QoS) criteria. Embodiments of the SAN manager 202 may include a LUN security utility for LUN management. Embodiments of the SAN manager 202 may include a LUN query tool that may query discovered LUNs based on user-specified quality of service criteria and provide input to the zone utility and group utility.

In one embodiment, other client applications, such as a Web browser, may function as clients to the SAN management server 200. In one embodiment, these other client applications may access the SAN access layer 204 via a SAN access layer API 300. In one embodiment, multiple SAN managers 202 may connect simultaneously with the SAN access layer 204 via the SAN access layer API 300, for example using a TCP/IP socket assigned to the SAN access layer 204. SAN manager 202 may run on any of a variety of end-user platforms coupled to one or more of the hosts 102, for example via a LAN or WAN, or alternatively may run on one of the hosts 102, including the host 102 that includes the SAN management server 200.

Embodiments of the centralized SAN management system may provide administrators with a single management interface to the complex tasks involved in managing a growing, multi-vendor SAN. Embodiments of the SAN management system may simplify and centralize the management of heterogeneous SANs to enable control of SAN resources including, but not limited to, logical volumes, fibre channel adapters, and switches 108, as well as storage devices 104. A logical volume is a virtual disk made up of logical disks. A logical disk (also referred to as a logical device) is a set of consecutively addressed FBA (Fixed Block Architecture) disk blocks that is part of a single virtual disk-to-physical disk mapping. Logical disks are normally not visible to the host environment, except during array configuration operations. A virtual disk is a set of disk blocks presented to an operating environment as a range of consecutively numbered logical blocks with disk-like storage and I/O semantics. The virtual disk is the disk array object that most closely resembles a physical disk from the operating environment's viewpoint.

The SAN management system may provide centralized management of SAN-connected devices with automatic discovery, visualization, access control, and policy-based monitoring, alerting and reporting. The SAN management system may provide a single point of management from logical unit to interconnect to SAN-connected hosts 102. An interconnect is a physical facility by which system elements are connected together and through which they can communicate with each other. Examples are I/O buses and networks.

The SAN management system may provide customizable, intuitive views into a SAN based on host 102, device, fabric 100, or storage groups, as well as real-time alerts to diagnose and avoid outages. By masking the administrative complexity of the SAN environment, the SAN management system may allow the potential of SANs to be realized.

SAN management may occur at two levels—physical and logical—to maintain control, regardless of the underlying device environment. With the discovery of host attributes like OS platform, OS handles and IP address, the critical link associating logical devices to a host 102 and its applications may be made. The SAN management system may provide this data-centric management from host applications through interconnects to the storage resources, regardless of the underlying hardware and operating system(s).

One embodiment of the SAN management system may include an integrated volume manager that may provide capabilities including, but not limited to, pooling storage across multiple heterogeneous arrays on the SAN. The SAN management system may automatically discover and display volumes within its interface. Additionally, adding storage to a host may be streamlined though the SAN management system. In one embodiment, when zoning storage to a host, the SAN management system may automatically initiate an operating system rescan so that the new device is immediately available for use by the volume manager on the host. This may be performed without user intervention at the operating system level, saving time and ensuring that the resource can be used immediately.

Embodiments of the SAN management system may provide accurate discovery, visualization and inventory reporting in the SAN environment. Embodiments may reduce or eliminate the manual task of tracking of devices and their connections in the SAN by automatically discovering the physical and logical connections of the SAN, displaying the information in a graphical topology map and logging the data in a variety of inventory reports. Using both in-band and out-of-band protocols, and leveraging industry standards, the SAN management system may automatically capture and display details, including, but not limited to, device driver version, firmware level, status, performance, free and in-use port count, hardware manufacturer, model number and worldwide name (WWN). In-band refers to transmission of a protocol other than the primary data protocol over the same medium (e.g. Fibre Channel) as the primary data protocol. Management protocols are a common example of in-band protocols. Out-of-band refers to transmission of management information for Fibre Channel components outside of the Fibre Channel network, for example over Ethernet. In one embodiment, a storage administrator may assign customized attributes to devices in the SAN for use in tracking information such as physical location, account code, installation date and asset tag number.

One embodiment of the SAN management system may enable the automatic discovery of SAN resources using one or more in-band and/or out-of-band protocols and industry standards (e.g. MS/CT, GS-3, SNMP, Fibre Alliance MIB, ANSI T11, vendor-specific extensions, etc.). This embodiment may reduce or eliminate the need for manual tracking of SAN components.

One embodiment of the SAN management system may provide a policy management service that may allow SAN environments to be customized to define what parameters are monitored and how they should be responded to through notification and action options such as e-mail, command line scripts, PERL scripts, and/or SNMP traps. One embodiment of the SAN management system may include a customizable policy service for intelligent threshold-based monitoring for SAN performance, status, availability and/or traffic. The SAN management system may provide policies for SAN objects to assist the user in maintaining SAN operations within user-defined parameters. The SAN management system may automatically monitor switch and storage resources, keep environment, error and traffic statistics, and provide automated capabilities. One embodiment may provide one or more policies based on the knowledge of various SAN hardware providers. Standard reports may also be provided, for example to support common storage service-level agreements.

One embodiment of the SAN management system may provide a real-time alert viewer that may monitor heterogeneous device status, and may provide proactive management capabilities in the SAN environment. By supplying policies on SAN devices, the SAN management system may monitor the status and performance of the device(s) and generate alerts when behavior falls outside acceptable user-defined boundaries. The SAN management system may enable intelligent monitoring through user-definable threshold levels that can take actions automatically as well as notify administrators of critical events in real time.

In one embodiment, the SAN manager 202 may provide a graphical user interface (GUI) through which the SAN management system facilitates management by allowing the user to graphically drill down into the logical and physical devices on the SAN. One embodiment may provide the ability to zoom in or out on areas of interest in a SAN topology map to simplify the navigation of a growing enterprise SAN. Within the topology map, integrated tool tips may be provided to help identify devices and paths in the SAN without having to navigate through a complex topology. Information on SAN devices, such as hosts 102 with Host Bus Adapters (HBAs), interconnects, and storage devices 104, may be displayed in context in the GUI, revealing resources in zones as they are physically and logically connected. One embodiment may include a search mechanism. For example, if the administrator wants to ensure that all interconnects in the SAN are at the same firmware level, the administrator may query an integrated search tool for firmware levels to automatically locate all the devices that match the search criteria for the specific firmware level.

Embodiments of the SAN management system may provide both real-time and historical performance data for critical service-level parameters such as connectivity, available space and throughput. Through real-time performance monitoring, with flexible user-defined thresholds, one embodiment may notify administrators about issues that could affect overall SAN performance before the issues have an impact. Logging this data for reporting may, for example, extend the administrator's capability to audit and validate service-level agreements.

One embodiment of the SAN management system may enable real-time performance charting of SAN devices. The SAN management system may monitor interconnect and storage devices in real time, and may be used to display information about the various SAN devices such as current load/status. The SAN management system may provide a troubleshooting platform for problem resolution.

Embodiments of the SAN management system may provide detailed capacity reports to aid in growth planning and gathers detailed information for use in chargeback reports.

One embodiment may track LUN allocation to hosts as well as to storage groups, distilling real-time and historical reports that show where storage resources are being consumed.

In one embodiment, the SAN management system may discover at least some storage enclosures automatically, but in some cases, the SAN management system may discover only the individual storage devices inside the enclosure. For enclosures that are not discoverable, the SAN management system may provide an enclosure utility that may be used to manually create a representation of an enclosure object in the SAN management server data store. In one embodiment, the enclosure utility may be provided through the SAN manager 202. Using the enclosure utility, the SAN administrator or other user may create an enclosure by specifying the type of enclosure and which devices are contained within it.

In one embodiment, policy-based management provided by the SAN management system enables the monitoring of conditions on a SAN and may facilitate quick response when problems occur. Conditions that may be monitored by the SAN management system may fall into one or more categories of interest to storage administrators, including, but not limited to, traffic on the SAN, the environment status of the SAN's hosts, switches, and disk arrays, errors the SAN is generating, and availability of ports and switches on the fabric.

Embodiments of the SAN management system may use one or more methods for monitoring conditions on a SAN. These methods may include, but are not limited to, out-of-band polling (e.g. SNMP polling), traps (e.g. SNMP traps), and the SAN access layer 204. In one embodiment, to monitor conditions on a SAN using SNMP polling, the SAN management system may periodically poll SNMP-enabled SAN devices to retrieve the current values of the properties defined in their vendor-supplied SNMP Management Information Bases (MIBs). To monitor conditions on a SAN using SNMP traps, some SAN objects may send SNMP traps to the SAN management server 200 when an event happens. The SAN access layer 204 may provide notification of SAN events such as the addition or deletion of SAN components such as SAN fabrics, switches and arrays. In one embodiment, the SAN management system may also monitor conditions in-band, e.g. using the Fibre Channel Common Transport (CT) protocol.

The SAN management system may manage a SAN by monitoring SAN devices and enforcing predefined actions should any device fail to operate within the defined boundaries. In one embodiment, to enable this level of policy management, the SAN management system may include collectors. In one embodiment, these collectors may be based on devices' SNMP MIB variables. A collector may be a path or channel through which the SAN management system gathers a specific type of data for a specific object type. There may be one or more types of collectors, for example collectors for object availability, collectors for environmental conditions, collectors for device errors, and collectors for SAN traffic. Collectors may monitor properties such as switch port status, dropped frames, disk temperature, link failures and so on, which may be evaluated by the policy service to create an accurate composite status of the SAN. In one embodiment, the status of devices may be displayed on a topology map of a SAN manager 202 user interface, for example using color-coded icons.

Embodiments of the SAN management system may use collector data in real-time collector graphs, the policy engine, and the SAN reporter. In one embodiment, collector values may be refreshed at regular intervals, forming one or more data streams that the SAN management system may use to monitor SAN conditions. Collectors may be used as the basis for policy conditions. In one embodiment, collector data may be stored and used to generate reports about the SAN. Collector data may be stored in a database 226 to provide a single source of accurate information for the entire SAN.

Each collector may use one of one or more methods for monitoring conditions on a SAN. These methods may include, but are not limited to, out-of-band polling (e.g. SNMP polling) and traps (e.g. SNMP traps) and the SAN access layer 204. The SAN access layer 204 may provide notification of SAN events such as the addition or deletion of SAN components such as SAN fabrics, switches and arrays. In one embodiment, one or more collectors may monitor conditions in-band, e.g. using the Fibre Channel Common Transport (CT) protocol.

In one embodiment, the SAN management system may include one collector per data type per object, for each object that can be monitored. In one embodiment, each collector may be associated with an object type, such as a SAN host 102 or a switch port. In one embodiment, each collector may be associated with a type of data, for example textual state or numeric threshold data. Textual state collectors may be associated with one or more possible values.

Traffic collectors may monitor SAN traffic at the switch port level. The SAN management system may provide a variety of collectors for different vendors including, but not limited to, Brocade, McDATA and QLogic. Various collectors may monitor SAN traffic metrics including, but not limited to, frames discarded, frames rejected, port utilization, and buffer credits.

Error collectors may be used to monitor SAN devices including switches and storage devices. For switches, monitored error information may include one or more of, but is not limited to, CRC errors, address errors, delimiter errors, invalid transmission words, link failures, link resets, sequence errors, signal loss, sync loss, encoding errors, frames too short/long, and invalid order sets. Error collectors may monitor storage devices for errors including one or more of, but not limited to, array processor errors, internal bus errors, cache errors, memory errors, warning errors, array status, and array failure. Storage devices that may be monitored may include one or more of, but are not limited to, RAID systems, disk arrays, JBODs, tape devices, and optical storage devices.

Environmental collectors may monitor environmental conditions of SAN objects. Monitored environmental conditions may include, but are not limited to, battery status, fan status, power supply status, and other detailed information for at least some objects including disk arrays and switches.

Availability collectors may provide monitoring of device availability states for fabrics 100, hosts 102, switches and other devices. Availability collectors may include, but are not limited to, device offline/online, device mode, fabric added/removed, host online/offline, and switch port online/offline collectors.

In one embodiment, the SAN management system may include a policy service that manages policies that are associated with objects on the SAN. Objects that may be monitored include, but are not limited to, fabrics 100, switches, switch ports, hosts 102, and disk arrays. The SAN management server 200 host 102 is also an object, and one embodiment may include a set of policies that monitor the SAN management server 200.

Policies may be viewed as rules that may be used to help manage a SAN by automating responses to certain events and conditions. Policies may detect when something goes wrong, and may be used to anticipate and handle problems before they occur. A policy may include a condition to monitor, such as a high percentage of bandwidth utilization on a switch port, and a set of actions to take when that condition is met, such as raising alerts on the SAN manager 202 user interface, sending e-mail, triggering SNMP traps, and/or invoking commands and/or scripts. In one embodiment, the policy service may be integrated with the SAN manager 202, permitting users to view what policies are in effect on their SAN, to define and modify policies, and to generate inventory and performance reports based on the conditions monitored by the policy service.

Policy rules may be expressed in ordinary language, for example: "If port utilization exceeds 90% of its total bandwidth for more than sixty seconds, send an e-mail to the system administrator." In one embodiment, if a condition specified by a policy is detected, the SAN management system may trigger an alarm, and the alarm instance may be added to a list of active alarms.

A policy may indicate a particular object or type of object to monitor. In general, any object for which the SAN management system provides at least one collector may be monitored. A policy may include a description of the condition to monitor on an object. The condition may be based on the value of a collector that represents the type of data to be monitored for the object. The condition may be either a quantitative evaluation (for example, less or more than a certain percentage of available disk space) or a textual value (such as whether a switch's status is "offline" or "online").

A policy may indicate one or more actions to be taken when the condition is detected. Actions may include raising an alert on the SAN manager 202 user interface, invoking commands and/or scripts, sending e-mail notification to a responsible party or parties (e.g. on an enterprise management system), and/or triggering SNMP traps (e.g. to management frameworks such as Hewlett-Packard OpenView).

One embodiment of the SAN management system may include a set of predefined policies that may be used "out of the box" to achieve at least some SAN monitoring goals without having to code and configure "custom" policies. In one embodiment, a predefined policy may send an alert to the SAN manager 202 as a default action in response to a default condition of the policy. In one embodiment, if desired, an administrator may modify the intervals that the policy service gathers SAN data, the conditions that trigger alerts and notifications, and the actions in the predefined policies. For example, the administrator may desire to adjust the threshold value for a monitored condition such as port utilization, or configure an action in addition to a default alert sent to the SAN manager 202. Predefined policies may include one or more of, but are not limited to, traffic policies, error policies, availability policies, and environment policies.

In one embodiment, the policy service may also provide a mechanism or mechanisms for users to create custom policies for collector types. In one embodiment, users may set the scope of a policy to apply to all objects that support a collector type. In one embodiment, users may set the scope of a policy to apply to all objects of a particular type. In one embodiment, users may set the scope of a policy to apply to a specific object.

One embodiment may include a policy engine that performs the instructions described in all policies enabled on the SAN. In one embodiment, the policy engine may be a component or process of the policy service. Each policy may be based on a particular type of data, represented by a collector, for a particular object or type of object. When the SAN management system discovers the objects on the SAN, it may determine which collectors correspond to the objects and register the relevant collectors with the policy engine. The policy engine then may receive stream(s) of real-time collector data and compare data values with the conditions described in its policies. When the alarm condition for a particular policy is met, the policy engine performs the actions described in the policy.

The policy engine may use current collector values from the data stream, and may retain the values in a buffer long enough to determine whether an alarm threshold has been met. For example, a threshold may be defined as "switch port utilization greater than eighty percent for two minutes." In this example, the policy engine may monitor the current value of a port utilization collector over a two-minute period. When a threshold condition is met, the policy engine performs whatever action is prescribed by that policy.

At least some policies may rely on vendor-supplied SNMP Management Information Bases (MIBs) to detect and monitor properties for switches, switch ports, disk arrays and other SAN devices such as switch port status, dropped frames, disk temperature, link failures, and so on. In one embodiment, the policy engine may use SNMP traps from some SAN devices, for example Brocade switches and Compaq arrays, for performance monitoring. SNMP traps from other SAN elements may simply trigger another discovery cycle.

In one embodiment, the SAN manager 202 may include a policy utility to facilitate policy creation and maintenance. The policy utility may lead a user through the steps of providing the information described above to create user-defined policies. The user may use the policy utility to make changes in existing predefined or user-defined policies as desired.

An alarm is a signal that is generated by a policy when the condition specified in the policy is detected or evaluated as true. An alarm may be triggered if the condition and alarm action are configured in the policy. Note that alarms are associated with alerts, but are not the same. An alarm is an internal signal used by the SAN management system. An alert to the SAN manager 202 is a configurable responses that may result from an alarm being triggered. When an alarm is triggered, the alarm may be referred to as active. In one embodiment, alarms in the SAN management system may be dynamic—the alarm resets itself automatically when the condition monitored by the policy returns to a specified "clear state." The clear state for a condition may specified either manually or automatically, depending on whether the condition is a threshold or a textual comparison condition.

One embodiment of the SAN management system may include an alarm service that may monitor and collect status and performance information from the SAN using both out-of-band (e.g., SNMP) and SAN access layer 204 events. In one embodiment, the alarm service may access the SAN access layer 204 via the SAN access layer API. This collector information may then be fed into the policy service to trigger policy actions such as SMTP mail, SAN manager alerts, shell scripts and command files, and logging for reporting purposes. In one embodiment, the SAN management system may log data collected by the alarm service in a database. One embodiment may use the Sybase ASA (Adaptive Server Anywhere) database management system for the database.

The conditions available for a policy may be determined by the type of object being monitored. Different types of policy conditions may result in different types of alarms. There are many possible types of conditions for various objects managed by the SAN management server 200. In one embodiment, these conditions may fall into one of two categories, threshold conditions and text comparison conditions.

One type of policy is a threshold condition with action policy. These policies may be used to monitor an object and detect when a particular numeric threshold is reached and sustained for a configurable period. The collector on which a threshold condition is based may provide data in numeric form, for example as numbered units or a percentage. This type of policy may also reset the alarm when the value being monitored returns to a normal, or below threshold value. Both the alarm state and the clear state of a threshold condition may be configured when defining the policy. A threshold condition with action policy may also provide a condition to reset the alert when the value being monitored returns to a normal, or below threshold value.

Another type of policy is a text comparison condition with action policy. This type of policy may be used to evaluate a textual state to determine the status or condition of the resource. The collector on which a text comparison condition is based provides data as one of one or more possible textual states defined for that collector. An example of a textual state is the port status of a switch as "online" or "offline." The clear state of a text comparison condition may be automatically assigned and may be, but not is necessarily, the opposite value of the specified alarm state.

For every policy, one or more actions to be taken when the specified condition is detected may be configured. Actions may, for example, perform corrective and/or notification functions. One type of policy action is a console alert, which may send an alert to the SAN manager 202 when the specified condition is detected. The desired level of severity associated with the action may be configurable. Another type of policy action is a command or script that executes a command or executable file specified for the action. Yet another type of policy action is to send e-mail notification to one or more specified recipients. In one embodiment, the policy service may be configured to send traps (e.g. SNMP traps) as notifications to network management platform applications such as Hewlett-Packard OpenView Network Node Manager, Tivoli TME, and others. The policy service traps may be handled like any other traps that are received by the network management application. In one embodiment, trap notification may be configured using the policy utility.

Utilities, tools and services provided by the SAN management system may include one or more of, but are not limited to, resource group, zoning, and LUN security utilities, tools and services, which are described below. In one embodiment, one or more of these utilities, tools and services may access the SAN access layer 204 via a SAN access layer API in performing their various functions.

In one embodiment of the SAN management system, the SAN manager 200 may serve as a centralized point from which a SAN administrator or other user may create and manage groups of SAN objects, including groups of heterogeneous components. A group may be defined as an arbitrary set of SAN elements defined by an administrator to help organize and provision resources. Groups may be implemented and used by storage administrators to identify and manually provision available storage devices 104 that match the quality of service requirements of particular user groups or applications. Groups may be used to represent the storage resources available to a particular host 102, sets of storage devices 104 with similar quality of service attributes, or for generic organizational purposes.

One embodiment of the SAN management system may provide a group utility for creating and managing logical groups of SAN objects including hosts 102, storage device 104 interconnects, other groups, and other objects that may be members of a group. In one embodiment, the group utility may be provided through the SAN manager 202. In one embodiment, the group utility may access the SAN access layer 204 via a SAN access layer API when creating and managing logical groups of SAN objects. The group utility may facilitate the management of end-user resources as logical groups of SAN objects. The group utility may be used to create logical storage groups where device membership may be based on zoning, LUN masking, hosts etc., and may also be based on the need for a collection of devices to be viewed as one entity for SAN management system activities such as reporting, configuring and monitoring SAN resources.

In one embodiment, the SAN management system may support one or more types of groups, including, but not limited to, generic groups, storage accounts, and storage groups. Generic groups may include switches, hosts 102, storage devices 104, and/or nested groups of any group type. A generic group may include any type of object that can be grouped. Generic groups may be defined and used as flexibly as the administrator likes. Storage accounts may include hosts 102, storage devices 104, and/or nested groups (storage accounts or storage groups only). A storage account may include one or more host objects and all the storage that the administrator assigns to them. Storage accounts may be used to keep track of the storage resources provisioned for hosts on the SAN. Storage groups may include storage devices 104 and/or nested groups (storage groups only). Storage groups may be used to categorize storage resources by quality of service criteria including, but not limited to, cost, performance, capacity and location.

In one embodiment, groups may be nested within other groups. Nested groups may not introduce cyclic dependency. That is, if Group B is nested within Group A, Group A cannot then be nested within Group B, creating a loop. In one embodiment, the SAN management system checks for cyclic dependency and prevents users from creating such a configuration. A generic group may include any other type of group nested within it. Storage accounts may include other storage accounts or storage groups, but may not include generic groups. Storage groups may include only other storage groups, and may not include storage accounts or generic groups.

In one embodiment, there is no member exclusivity applied to generic groups. An object may have membership in multiple generic groups. In one embodiment, in certain cases, if an object is already a member of a group, it may not become a member of another group. For example, if an object is already a member of a storage account, it may not be added to another storage account. As another example, if an object is already a member of a storage group, it cannot be added to another storage group. As yet another example, an object cannot be added to a group twice, for example by adding the object individually and adding a nested group in which the object is a member. If the object is first added individually, the nested group may not be added afterward, and vice versa. In one embodiment, member exclusivity may not apply when nesting groups. By nesting one group within another, objects within the nested group become members of both groups.

One embodiment of the SAN manager may provide a groups view through which the user may view and manage groups of SAN resources. In one embodiment, groups may be represented as directories including sub-branches for each type of member object. The groups view may be used, for example, to locate a particular group by name in order to view the storage devices, hosts, switches, or sub-groups included in that group. In one embodiment, a group may be selected and a SAN management system tool or utility, or optionally a third-party tool or utility, may be launched "in-context" to perform one or more operations on the group or member objects in the group.

Group information for SAN objects may be displayed in one or more other SAN manager 202 views and panes. In one embodiment, selecting a group in the groups view (or in one or more other views of the SAN manager) may highlight the group and/or members of the group and/or display group information in other views of the SAN manager. For example, when a group is selected in the groups view, its member objects may be highlighted in a topology map of the SAN manager. As another example, an attributes pane may display a group objects table when a group is selected.

In one embodiment, the SAN management system may be used to generate reports on groups of SAN objects. For example, capacity reports may display the storage capacity available in a user-defined group. As another example, groups inventory reports may provide information about one or more groups such as group name, description, total storage capacity, number of hosts, number of devices, number of switches, and number of nested groups. One embodiment may track LUN allocation to storage groups, and may provide one or more storage group LUN allocation reports that the user may use in tracking and managing storage group LUN allocation.

In one embodiment, the SAN management system may provide a LUN security utility, which may combine LUN security operations including, but not limited to, searching for and locating one or more LUNs, LUN selection, LUN to disk array port binding, LUN masking and fabric zoning operations in one utility. In one embodiment, the LUN security utility may be provided to the user through the SAN manager 202 user interface. In one embodiment, the LUN security utility may access the SAN access layer 204 via a SAN access layer API when performing LUN security tasks.

In one embodiment, the LUN security utility may provide a central utility that, through a graphical user interface, guides the user through configuring LUN security operations (finding and selecting one or more LUNs, binding, masking and zoning) and allows the user to execute the configured LUN security operations with a single operation, for example, a single click of a button in the user interface. Thus, the LUN security operations (finding and selecting one or more LUNs, binding, masking and zoning) may be performed as a single operation from the perspective of the user.

In one embodiment, if any portion of the LUN security operation (binding, masking, and/or zoning) configured and initiated by the user from the LUN security utility fails to successfully complete, the LUN security utility may "back out" of the entire configured LUN security operation, and may undo any portions of the LUN security operation already completed and/or leave undone any portions not yet performed. By so doing, the LUN security operation may leave the various SAN components being operated on by the LUN security operation in their original state before the start of the operation if any portion of the operation fails. Thus, LUN security operations configured and initiated using the LUN security utility may be viewed as transactions. A transaction may be defined as a sequence of information exchange and related work that is treated as a unit for the purposes of satisfying a request and for ensuring data integrity. For a transaction to be completed and changes to be made permanent, a transaction has to be completed in its entirety.

The SAN management system may provide a single point of management from logical units of storage devices 104 to interconnect to SAN-connected hosts 102. The LUN security utility may provide a central point from which to perform LUN security operations including LUN binding (the creation of access paths (LUNs) between Addressable Units within a disk array and ports on the array), LUN masking (enabling access to Addressable Units for host HBA ports) and fabric zoning (allowing the host to see the AU and create an Operating System (OS) handle for it).

The LUN security utility may guide users through searching and locating, selecting, binding, masking and zoning operations. The LUN security utility may be used to bind LUNs to ports on the array and further mask the LUN(s) to target host HBA ports. The LUN security utility may include safety controls to ensure that invalid LUN binding and LUN masking configurations are not created. The LUN security utility may support multiple storage array vendors, and thus may serve as a centralized utility for performing LUN security operations for heterogeneous SAN components.

Using the LUN security utility, users may specify LUNs and disk array ports to bind. In one embodiment, the SAN management system may provide a LUN query tool for finding and selecting LUNs. Users may also use the LUN security utility to select hosts' HBA ports and LUNs for LUN masking/security. The LUN security utility may allow users to select a zone that contains the array port and a host's HBA port(s). If no such zone exists, the LUN security utility may allow users to create a new zone or add the array port and the host's HBA port(s) to an existing zone.

Information about discovered SAN objects such as zones, hosts 102, HBAs, HBA ports, storage devices 104, array ports, addressable units and LUNs may be discovered by the SAN access layer 204 and provided to the SAN manager 202 and/or one or more components of the SAN management server 200 by the SAN access layer 204 via the SAN access layer API. The SAN management server 200 may use the provided information, for example, to configure collectors to collect information on the discovered SAN objects. The SAN manager 202 may use the provided information, as well as collected SAN data from the SAN management server 200, in one or more displays of SAN information.

In one embodiment, a user may launch the LUN security utility from the SAN manager 202. The discovered SAN objects (e.g., zones, hosts 102, HBAs, HBA ports, storage devices 104, array ports, addressable units and LUNs) provided to the SAN manager 202 by the SAN access layer 204 (via the SAN access layer API) and/or SAN management server 200 may be provided to the user in the LUN security utility, and the user may locate and select from the objects when configuring LUN security operations using the LUN security utility as described herein. As examples, array ports and addressable units may be selected for binding to create LUNs; LUNs may be located and selected, and hosts 102, HBAs and/or HBA ports may be selected to mask to the LUNs; and zones may be created and/or selected to which the HBA ports and LUNs are to be added. After selecting the SAN objects to be operated upon using the LUN security utility, the LUN security operations (e.g. binding, masking and zoning) may be performed as a single operation from the perspective of the user through the LUN security utility.

The LUN security operations as specified by the user in the LUN security utility may be performed to establish device paths in the SAN. In one embodiment, the SAN access layer may perform the LUN security operations (e.g. binding, masking and zoning) as specified by the user in the LUN security utility. In one embodiment, the SAN access layer may pass LUN security commands generated by the LUN security utility to the disk arrays' 102 management interfaces for execution using the disk array explorers. In one embodiment, the SAN access layer may pass LUN security commands generated by the LUN security utility to the hosts 102 for execution using the HBA explorers. In one embodiment, the SAN access layers may pass LUN security commands generated by the LUN security utility to the fabric devices for execution using the zoning explorers.

In one embodiment, the SAN manager may allow the user to remove the binding between a LUN and a port of an array in the SAN. In one embodiment, if a LUN is already bound to an array port, the user may mask a host port to the LUN by launching the LUN security utility in-context from a security pane of the SAN manager. This allows the user to skip the LUN selection and binding portions of the LUN security utility. In one embodiment, the SAN manager 202 may allow the user to remove LUN masking between a host port and an array LUN.

In one embodiment, for arrays that support user-configurable LUN binding, the SAN management system may provide an "Add LUN Binding" utility to bind LUNs without using the LUN security utility. In one embodiment, there may be a graphical user interface (e.g. a dialog box or window) to the "Add LUN Binding" utility in the SAN manager through which the user can bind LUNs. In one embodiment, the "Add LUN Binding" utility may access the SAN access layer 204 via a SAN access layer API.

In one embodiment, the SAN management system may provide a LUN masking utility that enables an administrator to mask LUNs to host ports without using LUN security utility. In one embodiment, there may be a graphical user interface (e.g. a dialog box or window) to the LUN masking utility in the SAN manager through which the user can mask LUNs. In one embodiment, the LUN masking utility may not provide the LUN security utility's safety features. For example, when the LUN masking utility is used to mask LUNs, the SAN management system may not check for valid LUN binding, wire connectivity, or fabric zoning between the host port and the array port. In one embodiment, the LUN masking utility may access the SAN access layer 204 via a SAN access layer API when performing LUN masking.

In one embodiment, the SAN management system may provide a LUN query tool, accessible, for example, from the SAN manager 202, that may be used to search for and find LUNs on the SAN that match one or more properties, such as device vendor, storage type, capacity, configuration, cost, and location. The LUN query tool may allow the user to further refine the search for LUNs based on the storage group(s) the LUNs are assigned to and/or on their accessibility from specified SAN-attached hosts 102. The LUN query tool may return a list of all LUNs that meets those requirements. The LUN query tool may be used, for example, when performing LUN security operations (e.g. binding, masking and zoning) and when allocating storage to the requester. In one embodiment, the LUN query tool may access the SAN access layer 204 via a SAN access layer API when performing LUN queries.

In one embodiment, the LUN query tool may be launched in context from another utility such as the zone utility or the LUN security utility. In this case, when the LUN query tool is closed, any selected LUNs in the LUN query tool results window may be selected (e.g. highlighted) in the UI of the utility from which the LUN query tool was launched.

In one embodiment, after using the LUN Query Tool to generate a list of LUNs that match search criteria, the user may create or edit a LUN attribute and apply the new attribute value across multiple LUNs in-context from the LUN query tool.

SAN Visualization and Reporting in the Exemplary SAN Management System

Figure 11:
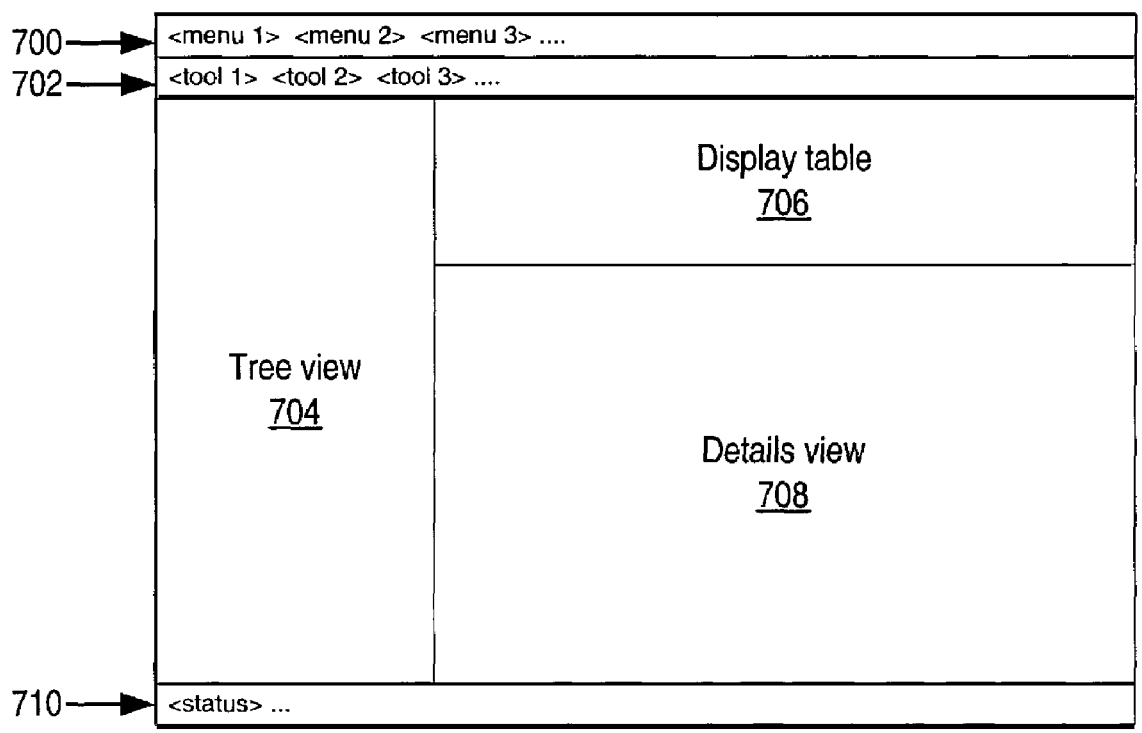
FIG. 11 illustrates an exemplary user interface of the SAN manager according to one embodiment.

In one embodiment of the SAN management system, the SAN manager 202 may serve as a centralized point from which a SAN administrator or other user may view information about a SAN, including, but not limited to, information about the SAN's topology and heterogeneous components. In one embodiment, the SAN manager 202 may provide a graphical user interface (GUI) that displays information from the SAN access layer 204 (accessed via the SAN access layer API 300) and other SAN management server 200 components. The SAN manager 202 may provide this information in an intuitive, navigable form, and may provide a central point to view the SAN, create and modify policies, administer zoning, and launch third-party SAN management tools. FIG. 11 illustrates an exemplary user interface of the SAN manager according to one embodiment. The SAN manager's user interface may include one or more of, but is not limited to, a menu bar 700, a toolbar 702, one or more panes (704, 706, 708), and a status bar 710.

Embodiments of the SAN manager may provide one or more display panes to display SAN information in complementary formats. Display panes may include, but are not limited to, a tree view 704, a display table 706, and a details view 708. The tree view 704 may include a directory tree of SAN objects. In one embodiment, an object selected in the tree view 704 may become active throughout the other areas of the SAN manager and may be highlighted in a topology map in details view 708. In one embodiment, object selection in the SAN manager may be unidirectional, moving from the tree view 704 to the other areas, so an object selected elsewhere in the SAN manager may not normally become active in the tree view 704. In one embodiment, the display table 706 functions as an extension of the tree view 704, and objects highlighted in the display table 706 may become active throughout the SAN manager.

In one embodiment, the tree view 704 may provide one or more user-selectable views of the SAN, including, but not limited to, a fabrics view, a storage view, a hosts view, and a groups view. The fabrics view may display objects on the SAN according to the objects' membership in fabrics and zones. Each fabric on the SAN may have its own root directory in the tree. Below each fabric in the fabrics view, the objects in the fabric may be categorized, for example as switches, unidentified adapters, unzoned objects, zone aliases, and zones.

The storage view may be used to view a list of SAN storage devices. The storage view may provide more granular information about SAN objects than the hierarchical fabrics view. The storage view may help the user to view storage device properties or zone memberships, and may be used in managing zone memberships. The list of unzoned storage devices may, for example, help the user to discover devices that may be added to a zone via the zone utility.

The hosts view may be used, for example, to locate a particular host by name in order to view its properties or its zone memberships. The hosts view may be used in managing zone memberships. The list of unzoned hosts may, for example, help the user to discover hosts that may be added to a zone via the zone utility. In one embodiment, the hosts view may include, but is not limited to, a list of hosts on the SAN, a list of unconnected hosts on the SAN, a list of unzoned hosts on the SAN, and a list of zoned hosts on the SAN.

In one embodiment, groups may be represented in a groups view as directories including sub-branches for each type of member object. When a group is selected, all its member objects may be highlighted in a topology map in the details view 708.

One embodiment may include a display table 706 that complements the object information selected in the tree view 704 by displaying the contents beneath a selected branch. The display table 706 may display information about the next layer of objects under the branch highlighted in the tree view 704. The types of details that appear in the display table 706 may depend on the type of object or meta-object (e.g. zones, object groups, etc.) selected in the tree view 704. For example, if "fabrics" is selected in the fabrics view, the names of all fabrics in the SAN may be displayed in the display table 706.

One embodiment may include a details view 708. In one embodiment, the details view 708 may provide one or more panes, each of which provides a different form of information about the SAN. The type and number of panes available in the details view 708 may change depending on what type of object or group is selected in the tree view 704. These panes may include, but are not limited to, a topology pane, an attributes pane, a policies pane, an alerts pane, a connectivity pane, an OS handles pane, an HBAs pane, a security pane, a collectors pane, an events pane, and various other panes of detailed object information. In one embodiment, at least a topology pane, an attributes pane, a policies pane, and an alerts pane may be displayed for each type of object or group.

The topology pane may provide a graphical representation of the SAN in the form of a topology map. The topology map may provide a visual representation of the objects on the SAN as well as a visual representation of the connections between objects. The topology map may reveal the switch port to which each object is connected. In one embodiment, connections displayed in an error color (e.g. red) indicate that a problem exists. In one embodiment, the user may select a connection or object in the topology map (e.g. by hovering the mouse cursor over the connection or object) to view detailed information about the connection or object. When a connection is selected, a "tool tip" may display the port at each end of the connection. For example, when a host is selected, information about the host may be displayed, and when a SAN storage device is selected, its properties may be shown.

In one embodiment, there may be one or more user-selectable topology map layouts, including, but not limited to, a hierarchical layout, a circular layout, a network layout, and a fan layout. In one embodiment, the hierarchical layout is the default layout. The hierarchical layout stratifies the topology map according to object type, with hosts at the top layer, switches below them, and devices of all kinds below the switches. The circular layout arranges the SAN objects in circular patterns that represent one or more objects connected to various ports on the switch. The circles of objects may not represent arbitrated loops on the SAN, however, and thus may not be used to get a list of objects that reside in an arbitrated loop. The network layout emphasizes the switches on the SAN by displaying them centrally among the various other objects to which they connect. The fan layout positions the switches at the top of the topology map and fans out all devices and hosts at a level below the switches in a symmetrical fashion.

The SAN management system may provide one or more methods to view object attributes. One method is an attributes pane in the details view 708. The attributes pane may display detailed information about the object or directory currently selected in the tree view 704. Different object types may be associated with different sets of attributes. The attributes pane may be available regardless of what object is selected in the tree view 704, but its contents may depend on the type of object selected. The attributes pane may display a table or tables that list the attributes and attribute values associated with the type of object selected.

In one embodiment, a connectivity pane may display connections between objects on the SAN. The connectivity pane may display information about objects that are highlighted in the tree view 704. The connectivity pane may be displayed when objects of various types are selected in the tree view 704, including, but not limited to, switches, switch ports, enclosures, storage devices, LUNs, hosts, HBAs, and unidentified adapters. In one embodiment, the connectivity pane may include one or more tables that may list attributes and attribute values of some or all objects in the connectivity pane.

In one embodiment, a details view 708 OS (Operating System) handles pane may be displayed when a host, an HBA, a storage device that contains one or more LUNs, or an individual LUN is selected in the tree view 704 (or alternatively in other views or panes of the SAN manager). The OS handles pane may display the relationships between HBA ports and the LUNs that are accessible to the HBA ports (i.e., the LUNs that are masked to those HBA ports). If a host or HBA object is selected in the SAN manager, the OS handles pane may display the WWN of the HBA port, and other information about a device port and LUN associated with that HBA port. If a device or LUN is selected, the OS handles pane may display a device port, path, and LUN, the associated host and HBA port, and other information. A different set of information may display in the OS handles pane depending on the type of object currently selected in the SAN manager.

In one embodiment, the details view 708 may include an HBAs pane. In one embodiment, the details view 708 HBAs pane is displayed when a host object is selected in the tree view 704. The HBAs pane may display information about each HBA discovered in the host. The HBAs pane may include a field that displays the discovered attributes of the HBA. The HBAs pane may also include a field that displays information about each port on the HBA. If a host has multiple HBAs, the HBA to view may be selected in the selected HBA field in the pane. The number of attributes of an HBA that are displayed may depend on which SAN management system explorer(s) has discovered the HBA. If the selected host is running the SAN access layer remote, then the host's HBAs may be discovered by the HBA explorer, which may provide more information about the HBAs.

In one embodiment, the details view 708 may include a security pane that may include one or more tables. In one embodiment, the security pane may include an array port binding table may display information including, but not limited to, the array LUN, the array port to which the LUN is bound, and the SCSI LUN ID. A single LUN may have multiple entries in this table if it is bound to more than one array port. Each entry in the table may represent a bound LUN-array port pair. In one embodiment, the details view 708 security pane may be displayed when certain enclosure objects are selected in the tree view 704. In one embodiment, the selected enclosure may be a storage array whose LUN security features the SAN management system supports. The security pane may display LUN security and LUN binding information about LUNs in the enclosure, including, but not limited to, the array LUN, the SCSI LUN ID, the array port to which the LUN is bound, the host(s) that are masked to the LUN, the World Wide Names of the HBAs that are masked to the LUN, and the World Wide Names of the HBA ports that are masked to the LUN. If an array is selected in the tree view 704, the array's LUNs that are bound to array ports may be displayed in the security pane.

In one embodiment, the security pane may include a LUN masking table that may be context-sensitive to selections in the array port binding table. The LUN masking table may display information about LUN-array port pairs selected in the array port binding table. In one embodiment, only LUNs that are bound to an array port appear in the security pane. If the free LUNs branch under the enclosure object is selected, then the security pane may display only LUNs that are bound to an array port and that have not yet been masked to any HBA.

In one embodiment, the details view 708 may include an alerts pane that may display alerts sent to the SAN manager in response to events on the SAN. Each alert in the alerts pane may represent a SAN event that has met either the trigger condition or the reset condition of an active policy. The alerts pane may display information about each alert including, but not limited to, the priority level of the alert, the date and time the alert was sent to the SAN manager, the description of the alert, which may include information about the trigger event, and the object at which the event occurred.

In one embodiment, the details view 708 may include an events pane that may display notifications of fabric events detected by the SAN access layer. These events may not be identical to the conditions monitored by the policy service, although the two may overlap to some extent. At least some events that appear in the events pane may be generated by changes in the discovery state of objects on the fabric, for example, when the SAN management server explorers no longer detect a previously discovered object. The events pane may be used, for example, as a debugging or troubleshooting tool. The events pane may display information about each event including, but not limited to, the object(s) on the fabric to which the event applies, the type of event, the time the event occurred, and the message associated with the event.

In one embodiment, the SAN management system may include a SAN reporter that enables the user to see reports on the details of the SAN. Embodiments of the SAN management system may provide both real-time and historical performance data for critical service-level parameters such as connectivity, available space and throughput. In one embodiment, the SAN management server may collect SAN data (gathered by the collectors) that may be provided as real-time and/or historical performance data to the SAN reporter for use in generating real-time and/or historical SAN performance reports. In one embodiment, the SAN access layer may discover SAN objects and information about the discovered objects that may be provided to the SAN reporter (in one embodiment, through the SAN access layer API) and used, for example, in SAN inventory and performance reports. Reports may be generated on various types of SAN objects, including, but not limited to, fabrics, devices, hosts, switches, HBAs and groups.

In one embodiment, reports may fall into one of one or more categories including, but not limited to, capacity reports, inventory reports, performance reports and alert reports. Capacity reports may display the storage capacity of the SAN as a whole and/or by subdivisions. Inventory reports may display physical objects and/or user-created objects such as groups and zones on the SAN. Performance reports may be based on the same collector information that is monitored by the policy engine. Performance reports may display the value of various collectors over a specified period (e.g. in graphical form). In one embodiment, performance reports may include traffic reports, error reports, summary reports and detail reports. Alert reports may provide information on historical alerts for a period covered by the report and summaries of the most active types of alerts during that period.

CONCLUSION

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A storage area network (SAN), comprising one or more hardware devices configured to implement:

a SAN access layer configured to discover a plurality of SAN objects and to gather information items from the plurality of SAN objects, wherein the plurality of SAN objects are coupled to a SAN fabric, wherein the SAN access layer includes an interface configured to provide access to a plurality of functions of the SAN access layer, and wherein the plurality of functions comprise one or more SAN management functions for performing one or more of discovery of the SAN objects, SAN security, or access configuration of the SAN;

a client application; and a SAN access layer Application Programming Interface (API) that provides access to only a portion of the plurality of functions of the SAN access layer, wherein the SAN access layer API is configured to:

receive authentication information from the client application;

determine a level of access to the plurality of functions of the SAN access layer based on the authentication information, wherein each level of access is associated with a respective subset of the portion of the plurality of functions of the SAN access layer;

receive one or more request messages formatted according to the SAN access layer API from the client application;

determine if the one or more request messages correspond to the determined level of access;

if the one or more request messages correspond to the determined level of access:

generate one or more request messages formatted according to the interface of the SAN access layer from the one or more request messages formatted according to the SAN access layer API; and transmit the one or more request messages formatted according to the interface of the SAN access layer to the SAN access layer;

wherein the SAN access layer is configured to perform one or more of the plurality of functions to manage the SAN in response to the one or more request messages formatted according to the interface of the SAN access layer.

2. The SAN as recited in claim 1, wherein the SAN access layer is further configured to:

generate one or more response messages formatted according to the interface of the SAN access layer in response to the received one or more request messages formatted according to the interface of the SAN access layer; and
transmit the one or more response messages formatted according to the interface of the SAN access layer to the SAN access layer API;
wherein the SAN access layer API is further configured to:
generate one or more response messages formatted according to the SAN access layer API from the one or more response messages formatted according to the interface of the SAN access layer; and
provide the one or more response messages formatted according to the SAN access layer API to the client application.

3. The SAN as recited in claim 2,
wherein the one or more request messages formatted according to the SAN access layer API received from the client application include requests for a portion of the information items gathered by the SAN access layer; and
wherein the one or more response messages formatted according to the SAN access layer API include the requested portion of the information items gathered by the SAN access layer.

4. The SAN as recited in claim 2,
wherein the one or more request messages formatted according to the interface of the SAN access layer include instructions for the SAN access layer to perform one or more of the functions of the SAN access layer; and
wherein the one or more response messages formatted according to the SAN access layer API include results of the one or more functions of the SAN access layer.

5. The SAN as recited in claim 1, wherein, to transmit the one or more messages formatted according to the interface of the SAN access layer to the SAN access layer, the SAN access layer API is further configured to establish a communications connection to the SAN access layer.

6. The SAN as recited in claim 1, wherein the one or more messages formatted according to the interface of the SAN access layer are formatted according to a markup language.

7. The SAN as recited in claim 1, wherein the one or more messages formatted according to the interface of the SAN access layer are eXtensible Markup Language (XML) messages.

8. The SAN as recited in claim 1, wherein the client application is configured to send the one or more request messages to the SAN access layer API to perform SAN management tasks on behalf of a user of a SAN management system, wherein the SAN management tasks comprise one or more of viewing a SAN topology, gathering real-time information about one or more SAN objects, performing a zoning operation and performing a LUN security operation.

9. The SAN as recited in claim 1, wherein the SAN access layer is configured to:
provide a common data representation for a plurality of heterogeneous SAN components to the client application via the SAN access layer API;
communicate, on behalf of the client application, with a particular SAN component of the plurality of heterogeneous SAN components using a particular protocol specific to the particular SAN component; and
communicate, on behalf of the client application, with another SAN component of the plurality of heterogeneous SAN components using another protocol specific to the other SAN component.

10. The SAN as recited in claim 1, wherein the SAN access layer comprises a plurality of explorer modules configured to perform an inventory of the SAN, wherein in performing the inventory, each explorer module of the plurality of explorer modules is configured to communicate with a different type of SAN component using a protocol specific to that type of SAN component.

11. The SAN as recited in claim 1, wherein the SAN access layer API comprises one or more security modules, one or more device discovery services modules, one or more event monitoring modules, and one or more internationalization modules.

12. The SAN as recited in claim 1, wherein the information gathered by the SAN access layer from a particular SAN object of the plurality of SAN objects comprises two or more of: a vendor name, a model number, a firmware version, a port count, a World Wide Name (WWN), an out-of-band address for the SAN object, zone membership information, and information indicative of connectivity between the particular SAN object and at least one other SAN object of the plurality of SAN objects.

13. A system, comprising one or more hardware devices configured to implement:
a client application; and
a SAN access layer Application Programming Interface (API) configured to support interactions between the client application and a SAN access layer, the SAN access layer configured to discover a plurality of SAN objects and to gather information items from the plurality of SAN objects, wherein the plurality of SAN objects are coupled to a SAN fabric, wherein the SAN access layer includes an interface configured to provide access to a plurality of functions of the SAN access layer, wherein the plurality of functions comprise one or more SAN management functions for performing one or more of discovery of the SAN objects, SAN security, or access configuration of the SAN, wherein the SAN access layer API is configured to provide access to only a portion of the plurality of functions of the SAN access layer, and wherein the SAN access layer API is configured to:
receive authentication information from the client application;
determine a level of access to the plurality of functions of the SAN access layer based on the authentication information, wherein each level of access is associated with a respective subset of the portion of the plurality of functions of the SAN access layer;
receive one or more request messages formatted according to the SAN access layer API from the client application;
determine if the one or more request messages correspond to the determined level of access;
if the one or more request messages correspond to the determined level of access:
generate one or more request messages formatted according to the interface of the SAN access layer from the one or more request messages formatted according to the SAN access layer API; and
transmit the one or more request messages formatted according to the interface of the SAN access layer to the SAN access layer;
wherein the SAN access layer is configured to perform one or more of the plurality of functions to manage the SAN in response to the one or more request messages formatted according to the interface of the SAN access layer.

14. The system as recited in claim 13, wherein the SAN access layer API is further configured to:
receive one or more response messages formatted according to the interface of the SAN access layer in response to the transmitted one or more request messages formatted according to the interface of the SAN access layer;
generate one or more response messages formatted according to the SAN access layer API from the one or more response messages formatted according to the interface of the SAN access layer; and
provide the one or more response messages formatted according to the SAN access layer API to the client application.

15. The system as recited in claim 14,
wherein the one or more request messages formatted according to the SAN access layer API received from the client application include requests for a portion of the information items gathered by the SAN access layer; and
wherein the one or more response messages formatted according to the SAN access layer API include the requested portion of the information items gathered by the SAN access layer.

16. The system as recited in claim 14,
wherein the one or more request messages formatted according to the interface of the SAN access layer include instructions for the SAN access layer to perform one or more of the functions of the SAN access layer; and
wherein the one or more response messages formatted according to the SAN access layer API include results of the one or more functions of the SAN access layer.

17. The system as recited in claim 13, wherein, to transmit the one or more messages formatted according to the interface of the SAN access layer to the SAN access layer, the SAN access layer API is further configured to establish a communications connection to the SAN access layer.

18. The system as recited in claim 13, wherein the one or more messages formatted according to the interface of the SAN access layer are formatted according to a markup language.

19. The system as recited in claim 13, wherein the one or more messages formatted according to the interface of the SAN access layer are eXtensible Markup Language (XML) messages.

20. A computer-implemented method, comprising:
receiving one or more request messages at a SAN access layer Application Programming Interface (API), wherein the one or more messages are received from a client application and are formatted according to the SAN access layer API, wherein the SAN access layer API is configured to support interactions between the client application and a SAN access layer, wherein the SAN access layer is configured to discover a plurality of SAN objects and to gather information items from the plurality of SAN objects, wherein the plurality of SAN objects are coupled to a SAN fabric, wherein an interface of the SAN access layer is configured to provide access to a plurality of functions of the SAN access layer, wherein the SAN access layer API is configured to provide access to only a portion of the plurality of functions of the SAN access layer, and wherein the plurality of functions relate to SAN management functions for performing discovery or access configuration of the SAN;
receiving authentication information from the client application;
determining a level of access to the plurality of functions of the SAN access layer based on the authentication information, wherein each level of access is associated with a respective subset of the portion of the plurality of functions of the SAN access layer;
determining if the one or more request messages correspond to the determined level of access;
if the one or more request messages correspond to the determined level of access:
the SAN access layer API generating one or more request messages formatted according to the interface of a SAN access layer from the one or more request messages formatted according to the SAN access layer API; and
the SAN access layer API transmitting the one or more request messages formatted according to the interface of the SAN access layer to the SAN access layer, wherein the SAN access layer is configured to perform one or more of the plurality of functions to manage the SAN in response to the one or more request messages formatted according to the interface of the SAN access layer.

21. The method as recited in claim 20, further comprising:
the SAN access layer generating one or more response messages formatted according to the interface of the SAN access layer in response to the received one or more request messages formatted according to the interface of the SAN access layer;
the SAN access layer transmitting the one or more response messages formatted according to the interface of the SAN access layer to the SAN access layer API;
the SAN access layer API generating one or more response messages formatted according to the SAN access layer API from the one or more response messages formatted according to the interface of the SAN access layer; and
the SAN access layer API providing the one or more response messages formatted according to the SAN access layer API to the client application.

22. The method as recited in claim 21,
wherein the one or more request messages formatted according to the SAN access layer API received from the client application include requests for a portion of the information items gathered by the SAN access layer; and
wherein the one or more response messages formatted according to the SAN access layer API include the requested portion of the information items gathered by the SAN access layer.

23. The method as recited in claim 21,
wherein the one or more request messages formatted according to the interface of the SAN access layer include instructions for the SAN access layer to perform one or more of the functions of the SAN access layer; and
wherein the one or more response messages formatted according to the SAN access layer API include results of the one or more functions of the SAN access layer.

24. The method as recited in claim 20, wherein said SAN access layer API transmitting the one or more messages formatted according to the interface of the SAN access layer to the SAN access layer comprises the SAN access layer API establishing a communications connection to the SAN access layer.

25. The method as recited in claim 20, wherein the one or more messages formatted according to the interface of the SAN access layer are formatted according to a markup language.

26. A tangible, computer-accessible storage medium, comprising program instructions, wherein the program instructions are computer-executable to implement:

receiving one or more request messages at a SAN access layer Application Programming Interface (API), wherein the one or more messages are received from a client application and are formatted according to the SAN access layer API, wherein the SAN access layer API is configured to support interactions between the client application and a SAN access layer, wherein the SAN access layer is configured to discover a plurality of SAN objects and to gather information items from the plurality of SAN objects, wherein the plurality of SAN objects are coupled to a SAN fabric, wherein an interface of the SAN access layer is configured to provide access to a plurality of functions of the SAN access layer, wherein the SAN access layer API is configured to provide access to only a portion of the plurality of functions of the SAN access layer, and wherein the plurality of functions relate to SAN management functions for performing discovery and/or access configuration of the SAN;

receiving authentication information from the client application;

determining a level of access to the plurality of functions of the SAN access layer based on the authentication information, wherein each level of access is associated with a respective subset of the portion of the plurality of functions of the SAN access layer;

determining if the one or more request messages correspond to the determined level of access;

if the one or more request messages correspond to the determined level of access:

the SAN access layer API generating one or more request messages formatted according to the interface of a SAN access layer from the one or more request messages formatted according to the SAN access layer API; and the SAN access layer API transmitting the one or more request messages formatted according to the interface of the SAN access layer to the SAN access layer, wherein the SAN access layer is configured to perform one or more of the plurality of functions to manage the SAN in response to the one or more request messages formatted according to the interface of the SAN access layer.

27. The tangible, computer-accessible storage medium as recited in claim 26, wherein the program instructions are further configured to implement:

the SAN access layer generating one or more response messages formatted according to the interface of the SAN access layer in response to the received one or more request messages formatted according to the interface of the SAN access layer;

the SAN access layer transmitting the one or more response messages formatted according to the interface of the SAN access layer to the SAN access layer API;

the SAN access layer API generating one or more response messages formatted according to the SAN access layer API from the one or more response messages formatted according to the interface of the SAN access layer; and the SAN access layer API providing the one or more response messages formatted according to the SAN access layer API to the client application.

28. The tangible, computer-accessible storage medium as recited in claim 27, wherein the one or more request messages formatted according to the SAN access layer API received from the client application include requests for a portion of the information items gathered by the SAN access layer; and wherein the one or more response messages formatted according to the SAN access layer API include the requested portion of the information items gathered by the SAN access layer.

29. The tangible, computer-accessible storage medium as recited in claim 27, wherein the one or more request messages formatted according to the interface of the SAN access layer include instructions for the SAN access layer to perform one or more of the functions of the SAN access layer; and wherein the one or more response messages formatted according to the SAN access layer API include results of the one or more functions of the SAN access layer.

30. The tangible, computer-accessible storage medium as recited in claim 26, wherein, in said SAN access layer API transmitting the one or more messages formatted according to the interface of the SAN access layer to the SAN access layer, the program instructions are further configured to implement the SAN access layer API establishing a communications connection to the SAN access layer.

31. The tangible, computer-accessible storage medium as recited in claim 26, wherein the one or more messages formatted according to the interface of the SAN access layer are formatted according to a markup language.

* * * * *